(12) United States Patent
Atur et al.

(10) Patent No.: US 12,445,427 B2
(45) Date of Patent: Oct. 14, 2025

(54) AGENTLESS GitOps AND CUSTOM RESOURCES FOR APPLICATION ORCHESTRATION AND MANAGEMENT

(71) Applicant: Rakuten Symphony, Inc., Tokyo (JP)

(72) Inventors: Sree Nandan Atur, Newark, CA (US); Ravi Kumar Alluboyina, Santa Clara, CA (US)

(73) Assignee: Rakuten Symphony, Inc., Tokyo (JP)

( * ) Notice: Subject to any disclaimer, the term of this patent is extended or adjusted under 35 U.S.C. 154(b) by 150 days.

(21) Appl. No.: 18/193,175

(22) Filed: Mar. 30, 2023

(65) Prior Publication Data
US 2024/0333704 A1    Oct. 3, 2024

(51) Int. Cl.
*H04L 9/40* (2022.01)
*G06F 8/65* (2018.01)
*G06F 9/54* (2006.01)

(52) U.S. Cl.
CPC ............ *H04L 63/0807* (2013.01); *G06F 8/65* (2013.01); *G06F 9/547* (2013.01)

(58) Field of Classification Search
CPC ......... H04L 63/0807; G06F 8/65; G06F 9/547
See application file for complete search history.

(56) References Cited

U.S. PATENT DOCUMENTS

| | | | |
|---|---|---|---|
| 1,347,806 A | 7/1920 | Fender | |
| 9,367,554 B1 | 6/2016 | Heemskerk | |
| 10,652,362 B1 * | 5/2020 | Kudari | ................ H04L 41/0883 |
| 10,671,373 B1 | 6/2020 | Walker | |
| 10,938,855 B1 * | 3/2021 | Waldie | ................ G06F 21/575 |
| 11,010,191 B1 * | 5/2021 | Hornbeck | ............ H04L 67/133 |
| 11,847,244 B1 | 12/2023 | Madan | |
| 12,166,747 B2 | 12/2024 | Zeng | |
| 2016/0065370 A1 | 3/2016 | Le Saint | |
| 2018/0341502 A1 * | 11/2018 | Rabasa | ................ G06F 9/453 |
| 2019/0146772 A1 | 5/2019 | Griffin | |

(Continued)

FOREIGN PATENT DOCUMENTS

FR    3091374    7/2020

OTHER PUBLICATIONS

Scott Chacon, Ben Straub. "Pro Git: Second Edition" (441 pages total, including pp. 1-426) https://library.oapen.org/bitstream/handle/20.500.12657/28155/1001839.pdf?sequence=1&isAllowed=y (Year: 2014).*

(Continued)

*Primary Examiner* — Joseph P Hirl
*Assistant Examiner* — Thomas A Gyorfi
(74) *Attorney, Agent, or Firm* — David R. Stevens; Stevens Law Group

(57) ABSTRACT

Systems and methods for agentless GitOps and custom resources for application orchestration and management. A system includes a bare metal server running a cloud native application and a plurality of clusters running on the bare metal server, wherein at least a portion of the plurality of clusters executes an application. The system includes a data center automation platform responsible for service management and orchestration for the bare metal server, wherein the data center automation platform subscribes to a git repository to receive updates pertaining to the application, and wherein a read only token is established between the git repository and the data center automation platform.

20 Claims, 25 Drawing Sheets

(56) References Cited

U.S. PATENT DOCUMENTS

| | | |
|---|---|---|
| 2020/0127994 A1 | 4/2020 | Kukreja |
| 2021/0006402 A1* | 1/2021 | Ohms .................. H04L 9/0643 |
| 2021/0019193 A1 | 1/2021 | French |
| 2021/0157615 A1 | 5/2021 | Lu |
| 2021/0392039 A1* | 12/2021 | Atur ....................... H04L 67/34 |
| 2022/0171699 A1 | 6/2022 | Velammal |
| 2022/0222053 A1* | 7/2022 | Mishra ..................... G06F 8/65 |
| 2022/0303295 A1* | 9/2022 | Erlingsson .......... G06F 16/9038 |
| 2023/0388286 A1 | 11/2023 | Zeng |
| 2024/0012885 A1 | 1/2024 | Sneider |

OTHER PUBLICATIONS

Spinellis et al., "A Dataset for GitHub Repository Deduplication", MSR '20: Proceedings of the 17th International Conference on Mining Software Repositories, pp. 523-527, Sep. 2020.

Gousios et al., "GHTorrent: Github's Data from a Firehose", 2012 9th IEEE Working Conference on Mining Software Repositories ( MSR), 2-3 June (Year: 2012).

\* cited by examiner

700

| Applications 718 |
| Orchestration Platform 716 |
| RPM, Drivers, Services, Configurations 714 |
| Operating System 712 |
| Network Configuration 710 |
| Storage Configuration 708 |
| Firmware Upgrades 706 |
| BIOS Configurations 706 |

Bare Metal Server 122

FIG. 7

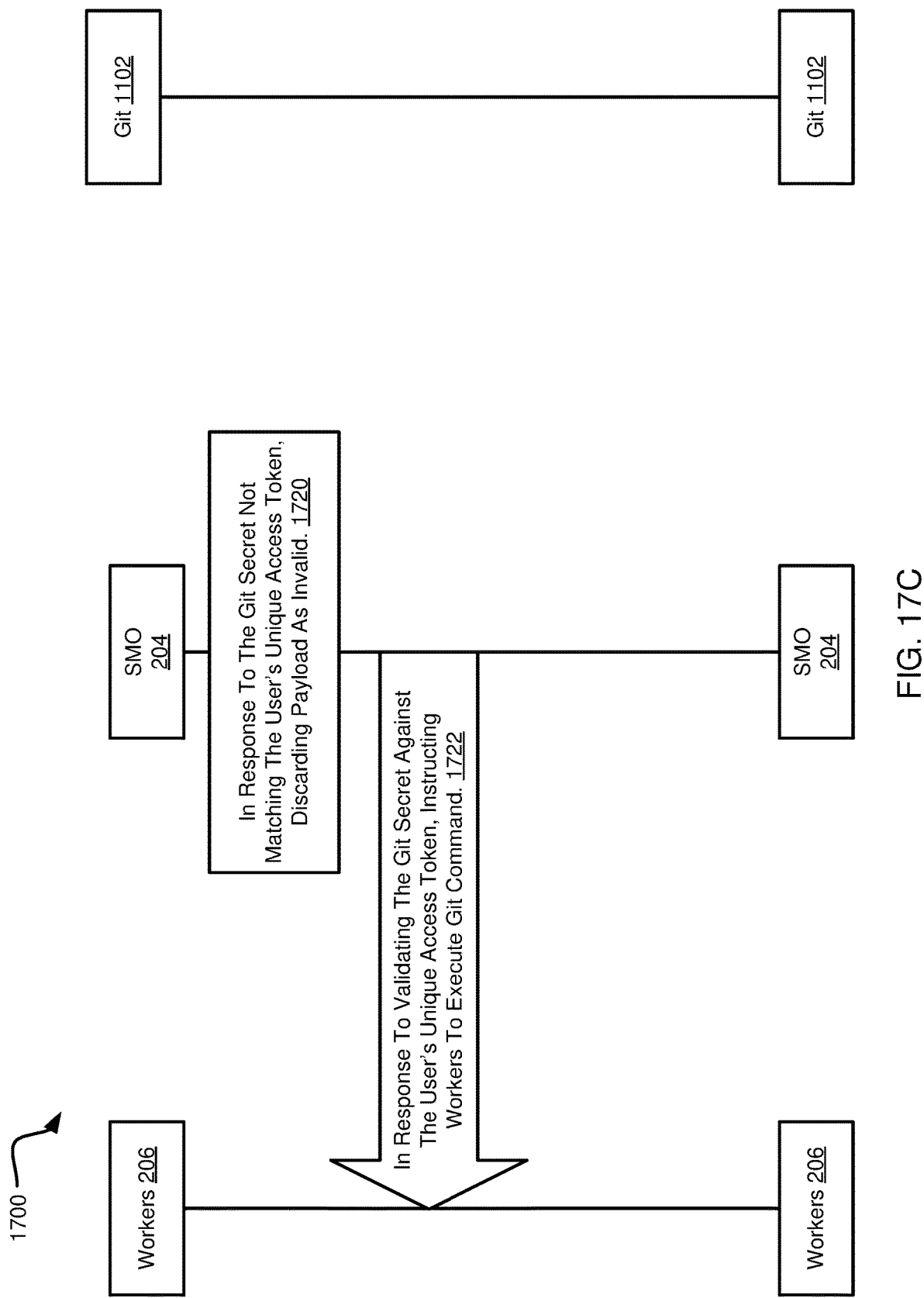

AGENTLESS GitOps AND CUSTOM RESOURCES FOR APPLICATION ORCHESTRATION AND MANAGEMENT

TECHNICAL FIELD

This disclosure relates generally to orchestration and management of cloud-based systems and relates specifically to agentless GitOps for infrastructure orchestration.

SUMMARY

Systems and methods for agentless GitOps and custom resources for application orchestration and management. A system includes a bare metal server running a cloud native application and a plurality of clusters running on the bare metal server, wherein at least a portion of the plurality of clusters executes an application. The system includes a data center automation platform responsible for service management and orchestration for the bare metal server, wherein the data center automation platform subscribes to a git repository to receive updates pertaining to the application, and wherein a read only token is established between the git repository and the data center automation platform.

BACKGROUND

Numerous industries benefit from and rely upon cloud-based computing resources to store data, access data, and run applications and tasks based on the stored data. These cloud-based computing systems may include complex infrastructures including numerous servers that execute different computing configurations. Depending on the complexity of the system, it can be challenging to manage life cycle management operations on the infrastructure, clusters, and applications executed by the cloud-based computing system.

In traditional systems, there are several products capable of providing service orchestration through GitOps, which is a set of practices to manage configurations using git, which is an open-source version control system. However, these traditional systems do not provide a means to manage infrastructure orchestrations and cluster orchestrations through GitOps. These traditional systems typically rely on an agent running on the server to perform service orchestration. However, the integrated agent can be computationally expensive and takes away resources that may be used by vital applications. These traditional systems also pose security risks by providing read and write access to the service orchestration agent.

In view of the foregoing, disclosed herein are improved systems, methods, and devices for service orchestration and life cycle management operations of infrastructure orchestrations, cluster orchestrations, and application orchestrations.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 7 is a schematic diagram of a provisioning process for connecting a bare metal server to a network computing system;

FIGS. 17A-17C are schematic flow chart diagrams of a process flow authenticating a payload received from a git repository by way of a git webhook;

DETAILED DESCRIPTION

Figure 1:
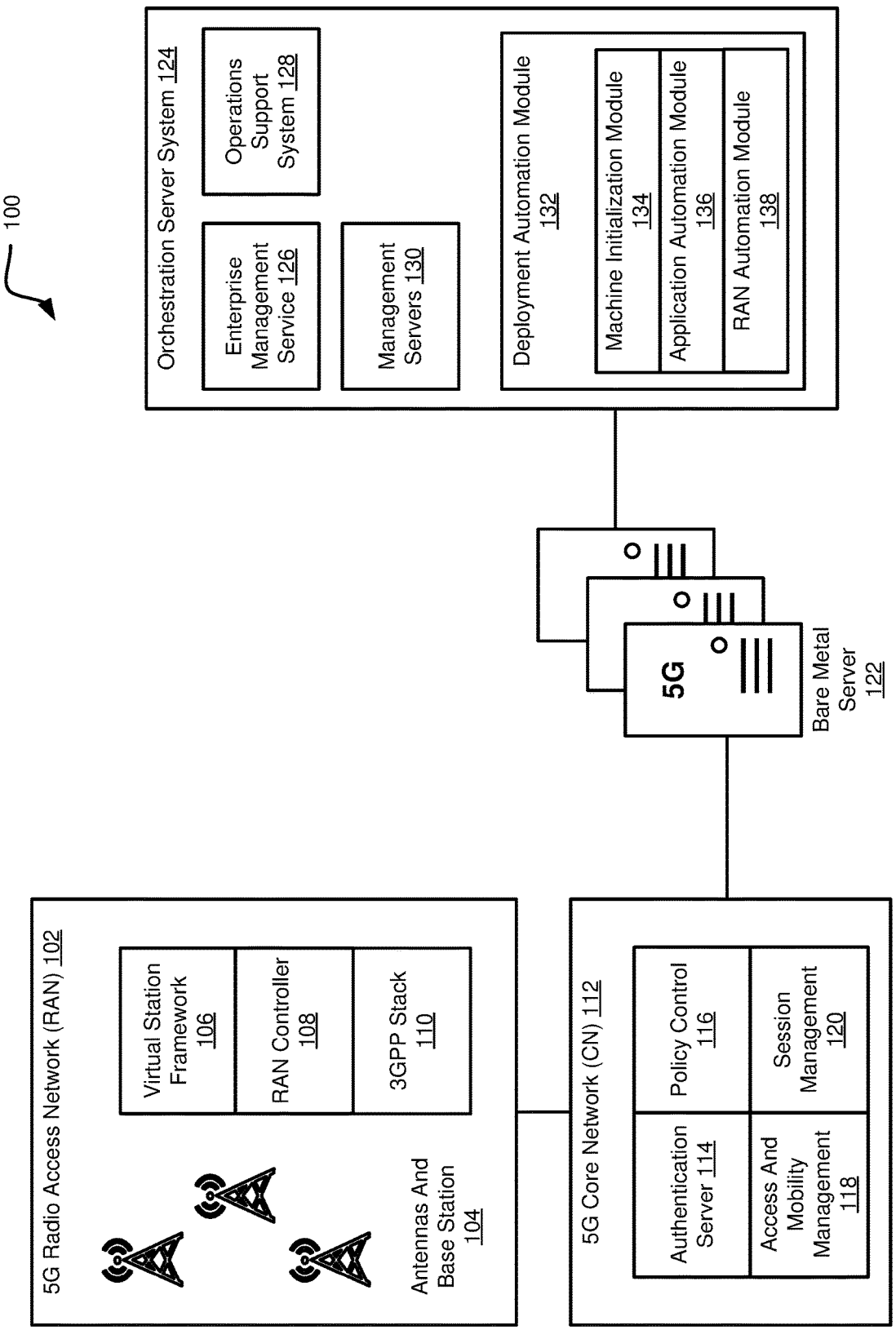
FIG. 1 is a schematic illustration of a network system in which the systems and methods disclosed herein may be implemented.

Disclosed herein are systems, methods, and devices for agentless GitOps for infrastructure orchestration, cluster orchestration, and application orchestration. The agentless GitOps functionality described herein is executed by a service management and orchestration (SMO) platform, which may be running on a multi-data center automation platform that executes functions and workflows. Further disclosed herein are systems, methods, and devices for establishing a communication channel with a git repository and authenticating payloads received from the git repository by way of a git webhook.

Traditional systems for application (service) orchestration function through GitOps by deploying an agent that is installed on a cluster as an operator. This introduces several drawbacks, including that this approach consumes CPU and memory on the cluster. This is not ideal for far-edge cluster use-cases because the operator consumes resources that could be used by the applications on a 5G stack. Additionally, these traditional systems require read and write access to a git repository, which means that a user must enable write access in the git authorization token to enable the traditional systems to write metadata information into the git repository. In many cases, this is considered a significant security concern. Additionally, these traditional helm-based systems are registered on the git repository, and thus it is not possible to perform data protection and migration operations like snapshot, clone, rollback, and backup on an application using the traditional systems. Additionally, these traditional systems make it difficult to enforce policies, propagate reconciliations across the clusters, or propagate changes across the clusters. In many cases, it is necessary to turn off reconciliation with a git repository or enforce policies like when or how the reconciliation will be implemented on the cluster. With traditional systems, there is no direct connection between the git repository and the cluster, and thus, any changes in the git repository will be directly reflected with local agents on the clusters. This can be very tedious without a central solution.

The systems, methods, and devices described herein address the aforementioned issues associated with traditional systems. As described herein, the SMO manages continuous deployment and continuous testing integrations using GitOps, which requires a private or public git repository. The SMO has a direct connection with a git repository in the form of notifications provided by git webhooks. As notifications can be lossy, the SMO also has a READ ONLY access to the git repository for reconciliations based on configurable durations. The systems and methods described herein enable numerous advantages, including circumventing the traditional need to run an agent or operator on clusters. The SMO interacts with the clusters for service orchestration with existing interfaces. Additionally, there is only one READ ONLY token shared with the SMO, rather than READ/WRITE token shared with each cluster. Additionally, in the SMO dashboard, an administrator can easily enforce policies like mute/unmute reconciliations with the git repository in a single cluster or set of clusters identified through labels and selectors. Further, there is no GitOps agent footprint on the clusters, such that the CPU and memory on far edge clusters are preserved for running applications. The improved system is highly secure because only one READ ONLY token is shared with the SMO.

With the systems and methods described herein, applications are represented as network services which are composed of network functions. With this abstraction, users automatically utilize GitOps to provision, configure, and upgrade applications. Additionally, users may protect applications through snapshot, clone, rollback, and backup. User may migrate and restore applications and may also deploy or upgrade entire 5G stack applications spanning multiple clusters.

GitOps is a set of practices to manage infrastructure and application configurations using git, which is an open-source version control system. GitOps is built around the developer experience and helps teams manage infrastructure using the same tools and processes they use for software development. In the git repository, users commit spec files in YAML format called CR (custom resource). The CR files describe applications, infrastructure, and cluster orchestrations. SMO provides operations for complete life cycle management of applications along with the ability to run tests and analyze test results.

GitOps is an operational framework that applies best practices for application deployment and applies those practices to infrastructure automation. GitOps may specifically deploy functionalities for version control, collaboration, compliance, and CI/CD (continuous integration (CI) and continuous delivery (CD)). In traditional systems, infrastructure development has largely remained a manual process that requires specialized teams. With the demands made on today's network infrastructures, it has become increasingly important to implement infrastructure automation. Modern infrastructure needs to be elastic to effectively manage cloud resources that are needed for continuous deployments.

GitOps is used to automate the process of provisioning infrastructure. Similar to how teams use application source code, operations teams that adopt GitOps use configuration files stored as code (infrastructure as code). GitOps configuration files generate the same infrastructure environment every time they are deployed, like application source code generates the same application binaries every time an application is built.

The systems, methods, and devices described herein provide means to perform day-0 through day-N life cycle management operations on infrastructure and clusters using GitOps infrastructure as code design pattern. The systems, methods, and devices described herein may specifically be implemented to configure clusters within a containerized workload management system such as the KUBERNETES® platform. In traditional systems, there are several products available that provide service orchestration through GitOps. However, these traditional systems fail to provide infrastructure and cluster orchestration through GitOps, as described herein.

Referring now to the figures, FIG. 1 is a schematic illustration of a system 100 in which the systems and methods disclosed herein may be used. The system 100 includes a 5G radio access network (RAN) 102 that includes a number of antennas and base stations 104. The 5G RAN 102 includes a virtual station framework 106, RAN controller 108, and 3GPP stack 110. The 5G RAN 102 communicates with a 5G core network (CN) 112. The 5G CN 112 includes an authentication server 114 along with functionality for policy control 116, access and mobility management 118, and session management 120.

The system 100 includes a number of bare metal servers 122 in communication with the 5G CN 112. The bare metal servers 122 comprise processing and memory resources configured to execute an orchestration server system 124. The orchestration server system 124 includes an enterprise management service 126, operations support system 128, management serves 130, and a deployment automation module 132.

A radio access network (RAN) is a component of a mobile telecommunication system. RANG implements a radio access technology (RAT) such as Bluetooth®, Wi-Fi®, global system for mobile communications (GSM), universal mobile telecommunication system (UMTS), long-term evolution (LTE), or 5G NR. Some of the systems, methods, and devices described herein are specifically directed to provisioning bare metal servers for communicating over a 5G NR network. Conceptually, a RAN resides between a device such as a mobile phone, computer, or any remotely controller machine, and provides connection with a core network (CN). Depending on the standard, mobile phones and other wireless connected devices are varyingly known as user equipment (UE), terminal equipment, mobile station (MS), and so forth. RAN functionality is typically provided by a silicon chip residing in both the core networks as well as the user equipment.

The orchestration server system 124 executes centralized management services used to manage the bare metal servers 122. Specifically, the orchestration server system 124 executes enterprise management services 126, operations support systems (OSS) 128, and one or more management servers 130 for services implemented on the bare metal servers 122. The orchestration server system 124 executes a deployment automation module 132 that facilitates deployment of the bare metal servers 122, and the services executing on the bare metal servers 122.

The deployment automation module 132 includes a machine initialization module 134 that detects and initializes hardware within the system 100. The hardware may include computing and storage devices for implementing the baseboard units 106 or the bare metal servers 122. For example, given a computing device configured with an IP address, the machine initialization module 134 may initialize the BIOS (basic input output system), install an operating system, configure the operating system to connect to a network and to the orchestration server system 124, and install an agent for facilitating installation of services and for performing management functions on the computing device at the instruction of the deployment automation module 132. For example, the machine initialization module 134 may use COBBLER in order to initialize the computing device.

The machine initialization module 134 may also discover computing devices on a network and generate a topology of the devices, such as in the form of a directed acyclic graph (DAG). The deployment automation module 132 may then use this DAG to select computing devices for implementing network services and in order to configure a machine to receive installation of a network service.

The deployment automation module 132 may include an application automation module 136 that automates the deployment of an application, such as a container executing an application on a computing device. The application automation module 136 may implement methods and systems described below relating to the automated deployment and management of applications.

One example application of the systems and methods disclosed herein is a radio area network (RAN) automation module 138 that performs the automated deployment of a network service in the illustrated network environment, including instantiating, configuring, and managing services executing on the bare metal servers 122 and the orchestration server system 124 order to implement a RAN in a one-click automated fashion.

Figure 2:
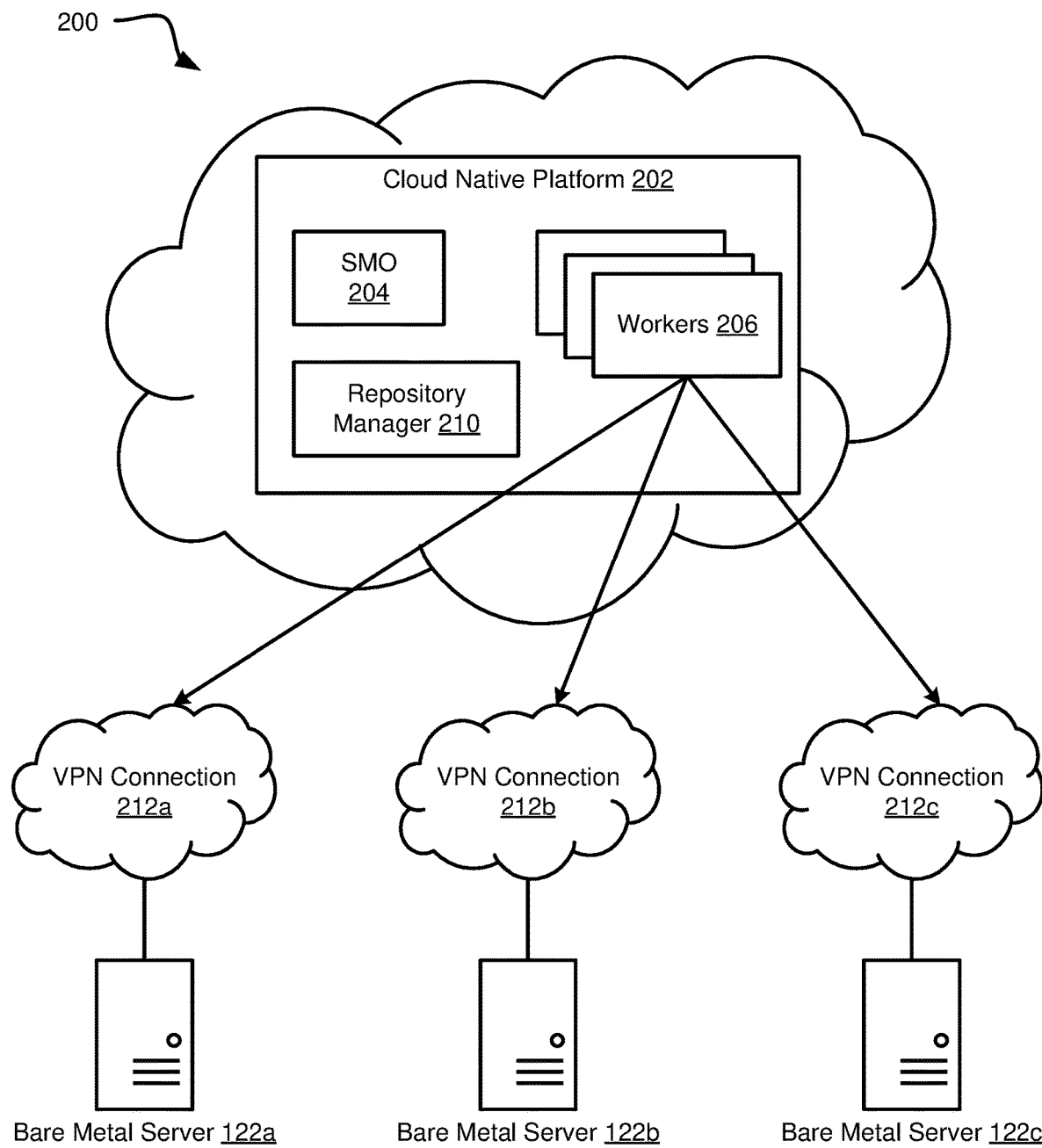
FIG. 2 is a schematic block diagram of a system for remotely orchestration bare metal servers.

FIG. 2 is a schematic block diagram of a system 200 for remotely orchestrating bare metal servers. The system 200 includes a cloud native platform 202 comprising a plurality of workers 206 executing an instance of a service management and orchestration (SMO) 204 platform. The cloud native platform 202 further includes an instance of a repository manager 208. The workers 206 communicate with a plurality of bare metal servers 122a-122c by way of dedicated VPN connections 212a-212c.

The SMO 204 is installed on a cloud-based instance of computing system. The SMO 204 may be installed on an edge server associated with the orchestration server system 124 described herein. The SMO 204 may be executed by one or more clusters within a containerized workload management system, such as the KUBERNETES® system described herein. In some implementations, and depending on the client's needs, the SMO 204 may provide a software as a service (SaaS) solution running on an outside database platform such as Amazon Web Services® or Google Kubernetes Engine®.

The bare metal servers 122a, 122b, 122c (may collectively be referred as bare metal servers 122 as described herein) are located remote from the computing resources for the cloud native platform 202. The bare metal servers 122 may specifically be located on-premises at a location associated with a client. This is in contrast with a server group managed by an outside entity such as Amazon Web Services® or Google Kubernetes Engine®. Each bare metal server 122 is associated with a client that utilizes the SMO BMaaS functionality.

The clients associated with the bare metal servers 122 provide the necessary VPN connections 212a, 212b, 212c (may collectively be referred to as a VPN connection 212 as described herein) to the workers 206 executing the SMO 204. The VPN connections 212 enable the workers 206 to reach the corresponding bare metal server 122.

The SMO 204 onboards users with a username and password. A registered user may register a bare metal server 122 with the SMO 204 by providing a baseboard management controller (BMC) IP address, BMC username, BMC password, and VPN credentials for the bare metal server 122. The user may then instruct the SMO 204 to install on operating system on the bare metal server 122.

The system 200 enables a virtually frictionless means to onboard new clients and configure remote bare metal servers 122 associated with the newly onboarded clients. In traditional systems, the onboarding system must touch the client's DHCP server, TFTP server, and HTTP server to store and serve operation system images.

Figure 3:
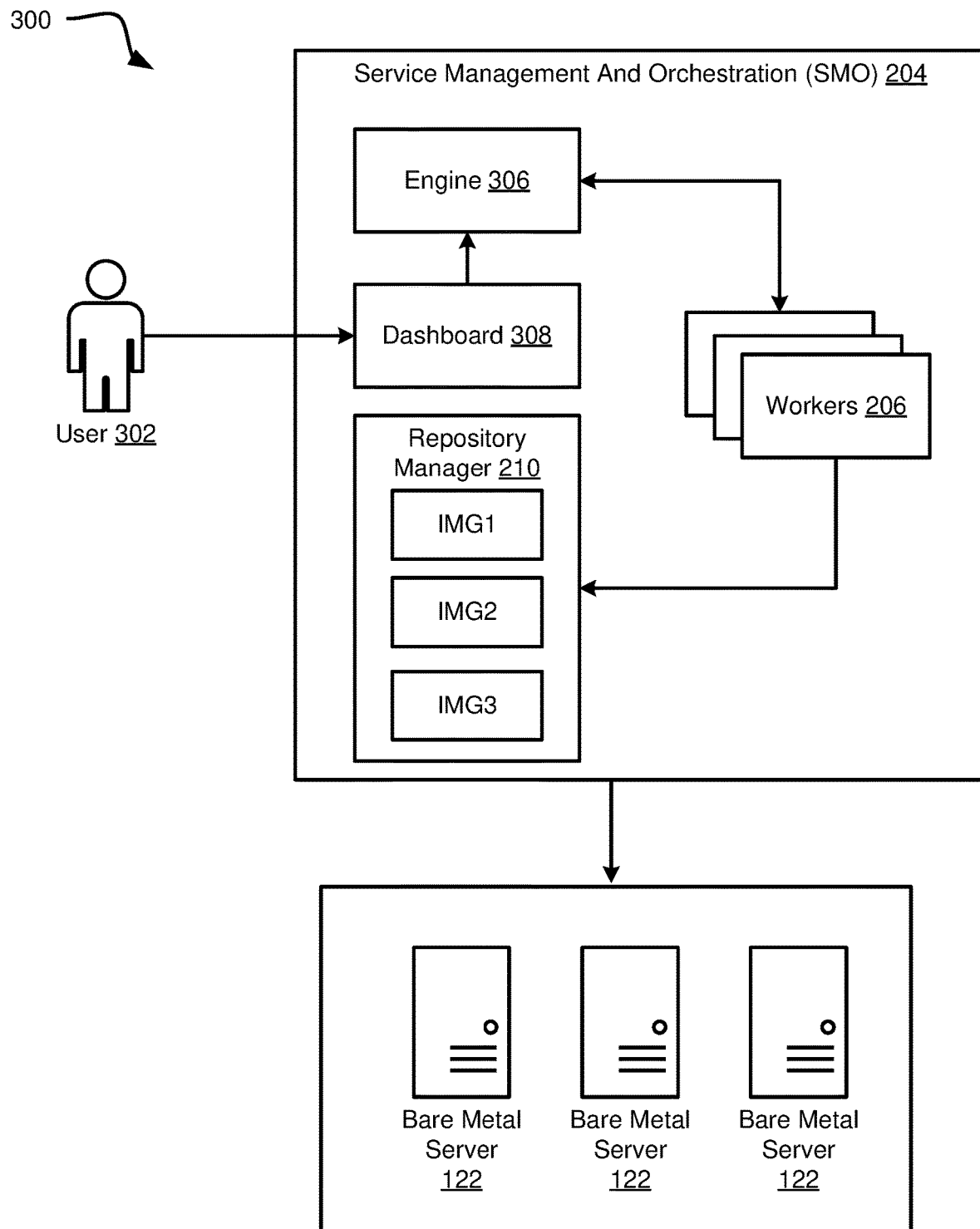
FIG. 3 is a schematic block diagram of a system for registering a bare metal server with a data center automation platform for managing a bare metal server and connecting the bare metal server to a workload management system.

FIG. 3 is a schematic block diagram of a system 300 registering a bare metal server 122 with an SMO 204 for managing the bare metal server 122 and connecting the bare metal server 122 to one or more clusters of a containerized workload management system.

The SMO 204 includes an engine 306 and a dashboard 308. The SMO 204 renders the dashboard on a user interface 308 accessible by the user 302. The SMO 204 includes or communicates with a plurality of workers 206, which may include compute nodes within a containerized workload management system. The SMO 204 includes or accesses a repository manager 210 that manages binary resources for the SMO 204.

The repository manager 210 serves as a central hub for integrating with tools and processes to improve automation of the system 300 and increase system 300 integrity. In some implementations, the repository manager 210 is implemented as an ART FACTORY. The repository manager 210 organizes binary resources, including, for example, remote artifacts, proprietary libraries, third-party resources, and so forth. The repository manager 300 pulls these resources into a single centralized location for a plurality of bare metal servers 122.

The repository manager 300 manages and automates artifacts and binaries from start to finish during the application delivery process. The repository manager 300 enables the option to select from different software build packages, major CI/CD (continuous integration/continuous development) systems, and other development tools. The repository manager 300 may be implemented within a KUBERNETES containerized system with a DOCKER registry with full REST APIs 502 as discussed herein. The repository manager 300 supports containers, Helm charts, and DOCKER.

Figure 4A:
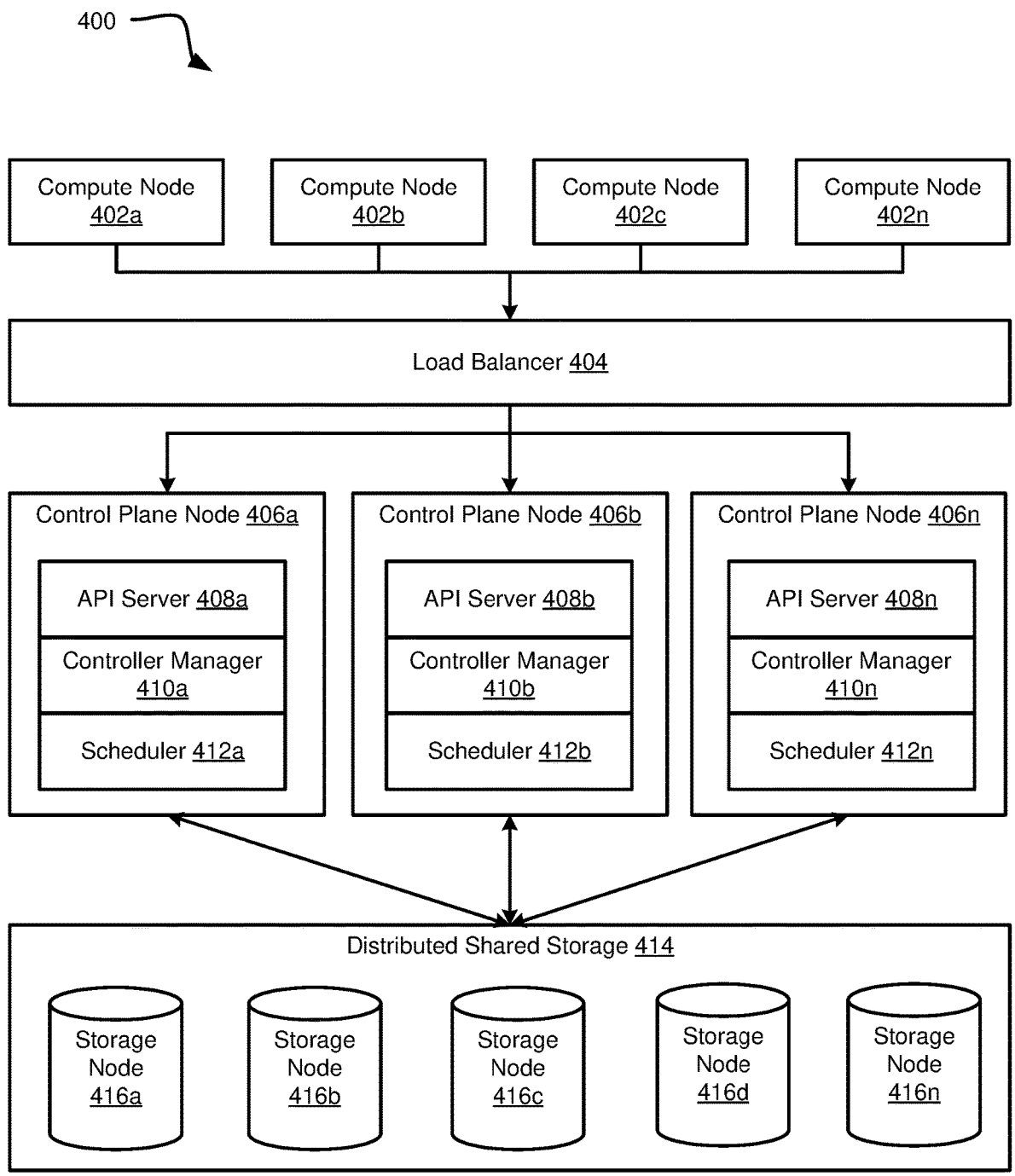
FIG. 4A is a schematic block diagram of a system for automated deployment, scaling, and management of containerized workloads and services, wherein the system draws on storage distributed across shared storage resources.
Figure 4B:
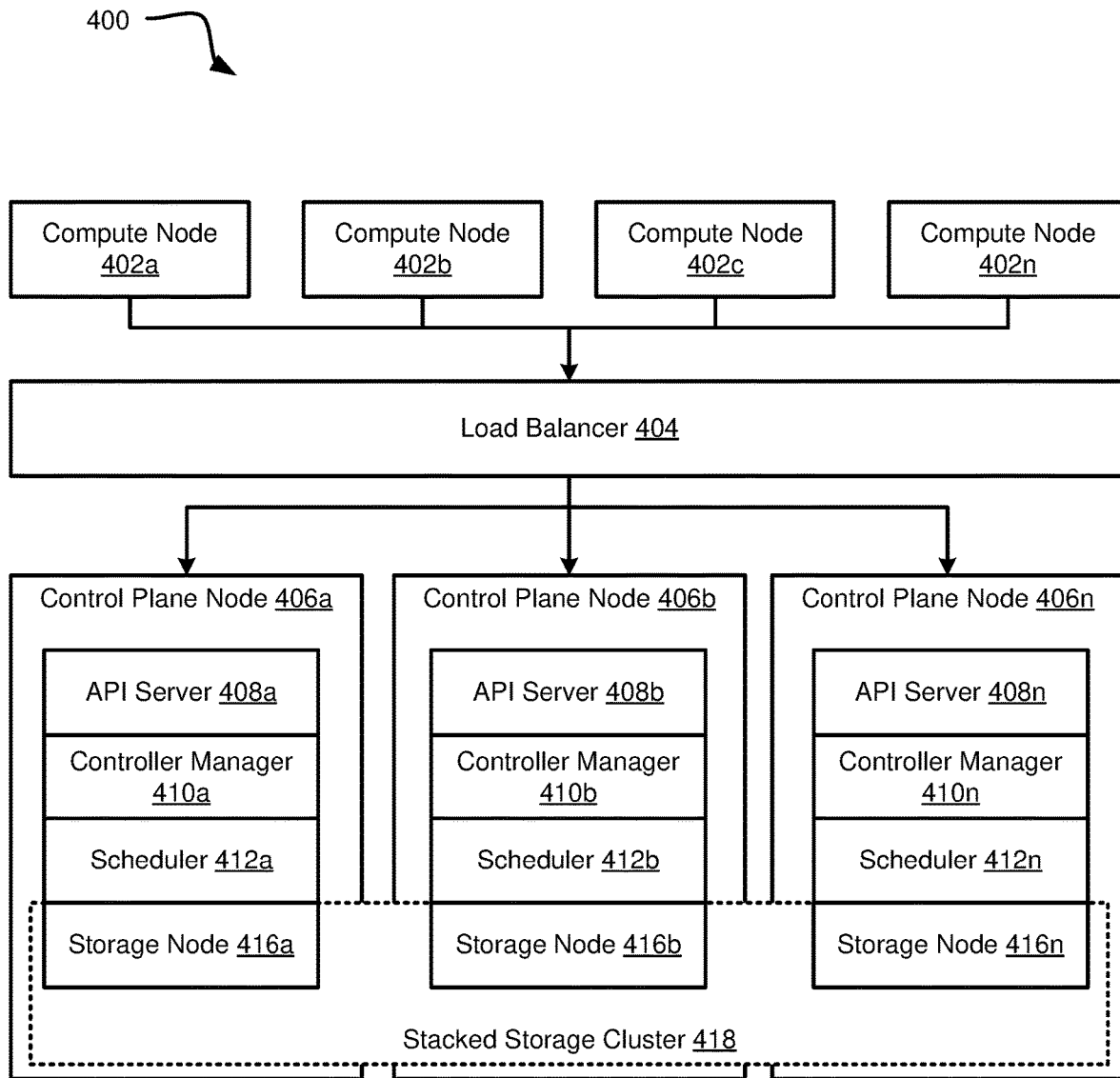
FIG. 4B is a schematic block diagram of a system for automated deployment, scaling, and management of containerized workloads and services, wherein the system draws on storage within a stacked storage cluster.

FIGS. 4A and 4B are schematic illustrations of an example system 400 for automated deployment, scaling, and management of containerized workloads and services. The processes described herein for zero touch provisioning of a bare metal server 122 may be implemented to connect the bare metal server 122 with a containerized system such as those described in connection with FIGS. 4A-4B. The system 400 facilitates declarative configuration and automation through a distributed platform that orchestrates different compute nodes that may be controlled by central master nodes. The system 400 may include "n" number of compute nodes that can be distributed to handle pods.

The system 400 includes a plurality of compute nodes 402a, 402b, 402c, 402n (may collectively be referred to as compute nodes 402 as discussed herein) that are managed by a load balancer 404. The bare metal servers 122 described herein may be implemented within the system 400 as a compute node 402. The load balancer 404 assigns processing resources from the compute nodes 402 to one or more of the control plane nodes 406a, 406b, 406n (may collectively be referred to as control plane nodes 406 as discussed herein) based on need. In the example implementation illustrated in FIG. 4A, the control plane nodes 406 draw upon a distributed shared storage 114 resource comprising a plurality of storage nodes 416a, 416b 416c, 416d, 416n (may collectively be referred to as storage nodes 416 as discussed herein). In the example implementation illustrated in FIG. 4B, the control plane nodes 406 draw upon assigned storage nodes 416 within a stacked storage cluster 418.

The control planes 406 make global decisions about each cluster and detect and responds to cluster events, such as initiating a pod when a deployment replica field is unsatisfied. The control plane node 406 components may be run on any machine within a cluster. Each of the control plane nodes 406 includes an API server 408, a controller manager 410, and a scheduler 412.

The API server 408 functions as the front end of the control plane node 406 and exposes an Application Program Interface (API) to access the control plane node 406 and the compute and storage resources managed by the control plane node 406. The API server 408 communicates with the storage nodes 416 spread across different clusters. The API server 408 may be configured to scale horizontally, such that it scales by deploying additional instances. Multiple instances of the API server 408 may be run to balance traffic between those instances.

The controller manager 410 embeds core control loops associated with the system 400. The controller manager 410 watches the shared state of a cluster through the API server 408 and makes changes attempting to move the current state of the cluster toward a desired state. The controller manager 410 may manage one or more of a replication controller, endpoint controller, namespace controller, or service accounts controller.

The scheduler 412 watches for newly created pods without an assigned node, and then selects a node for those pods to run on. The scheduler 412 accounts for individual and collective resource requirements, hardware constraints, software constraints, policy constraints, affinity specifications, anti-affinity specifications, data locality, inter-workload interference, and deadlines.

The storage nodes 416 function as a distributed storage resources with backend service discovery and database. The storage nodes 416 may be distributed across different physical or virtual machines. The storage nodes 416 monitor changes in clusters and store state and configuration data that may be accessed by a control plane node 406 or a cluster. The storage nodes 416 allow the system 400 to support discovery service so that deployed applications can declare their availability for inclusion in service.

In some implementations, the storage nodes 416 are organized according to a key-value store configuration, although the system 400 is not limited to this configuration. The storage nodes 416 may create a database page for each record such that the database pages do not hamper other records while updating one. The storage nodes 416 may collectively maintain two or more copies of data stored across all clusters on distributed machines.

Figure 5:
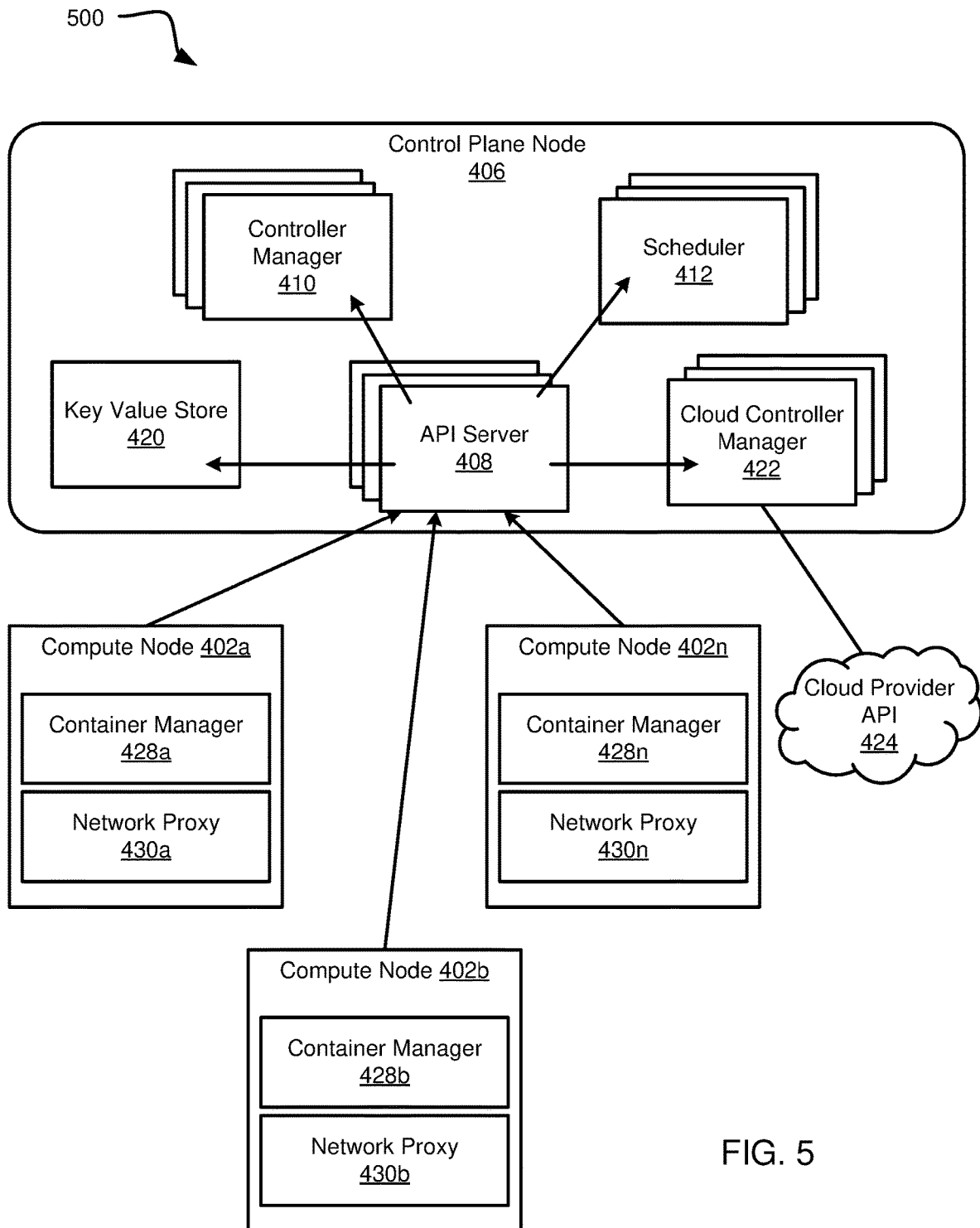
FIG. 5 is a schematic block diagram of a cluster for automated deployment, scaling, and management of containerized applications.

FIG. 5 is a schematic illustration of a cluster 500 for automating deployment, scaling, and management of containerized applications. The cluster 500 illustrated in FIG. 5 is implemented within the systems 400 illustrated in FIGS. 4A-4B, such that the control plane node 406 communicates with compute nodes 402 and storage nodes 416 as shown in FIGS. 4A-4B. The cluster 500 groups containers that make up an application into logical units for management and discovery.

The cluster 500 deploys a cluster of worker machines, identified as compute nodes 402a, 402b, 402n. The compute nodes 402 include one or more bare metal servers 122 that have been provisioned according to the processes described herein. The compute nodes 402a-402n run containerized applications, and each cluster has at least one node. The compute nodes 402a-402n host pods that are components of an application workload. The compute nodes 402a-402n may be implemented as virtual or physical machines, depending on the cluster. The cluster 500 includes a control plane node 406 that manages compute nodes 402a-402n and pods within a cluster. In a production environment, the control plane node 406 typically manages multiple computers and a cluster runs multiple nodes. This provides fault tolerance and high availability.

The key value store 420 is a consistent and available key value store used as a backing store for cluster data. The controller manager 410 manages and runs controller processes. Logically, each controller is a separate process, but to reduce complexity in the cluster 500, all controller processes are compiled into a single binary and run in a single process. The controller manager 410 may include one or more of a node controller, job controller, endpoint slice controller, or service account controller.

The cloud controller manager 422 embeds cloud-specific control logic. The cloud controller manager 422 enables clustering into a cloud provider API 424 and separates components that interact with the cloud platform from components that only interact with the cluster. The cloud controller manager 422 may combine several logically independent control loops into a single binary that runs as a single process. The cloud controller manager 422 may be scaled horizontally to improve performance or help tolerate failures.

The control plane node 406 manages any number of compute nodes 126. In the example implementation illustrated in FIG. 5, the control plane node 406 is managing three nodes, including a first node 126a, a second node 126b, and an nth node 126n (which may collectively be referred to as compute nodes 126 as discussed herein). The compute nodes 126 each include a container manager 428 and a network proxy 430.

The container manager 428 is an agent that runs on each compute node 126 within the cluster managed by the control plane node 406. The container manager 428 ensures that containers are running in a pod. The container manager 428 may take a set of specifications for the pod that are provided through various mechanisms, and then ensure those specifications are running and healthy.

The network proxy 430 runs on each compute node 126 within the cluster managed by the control plane node 406. The network proxy 430 maintains network rules on the compute nodes 126 and allows network communication to the pods from network sessions inside or outside the cluster.

Figure 6:
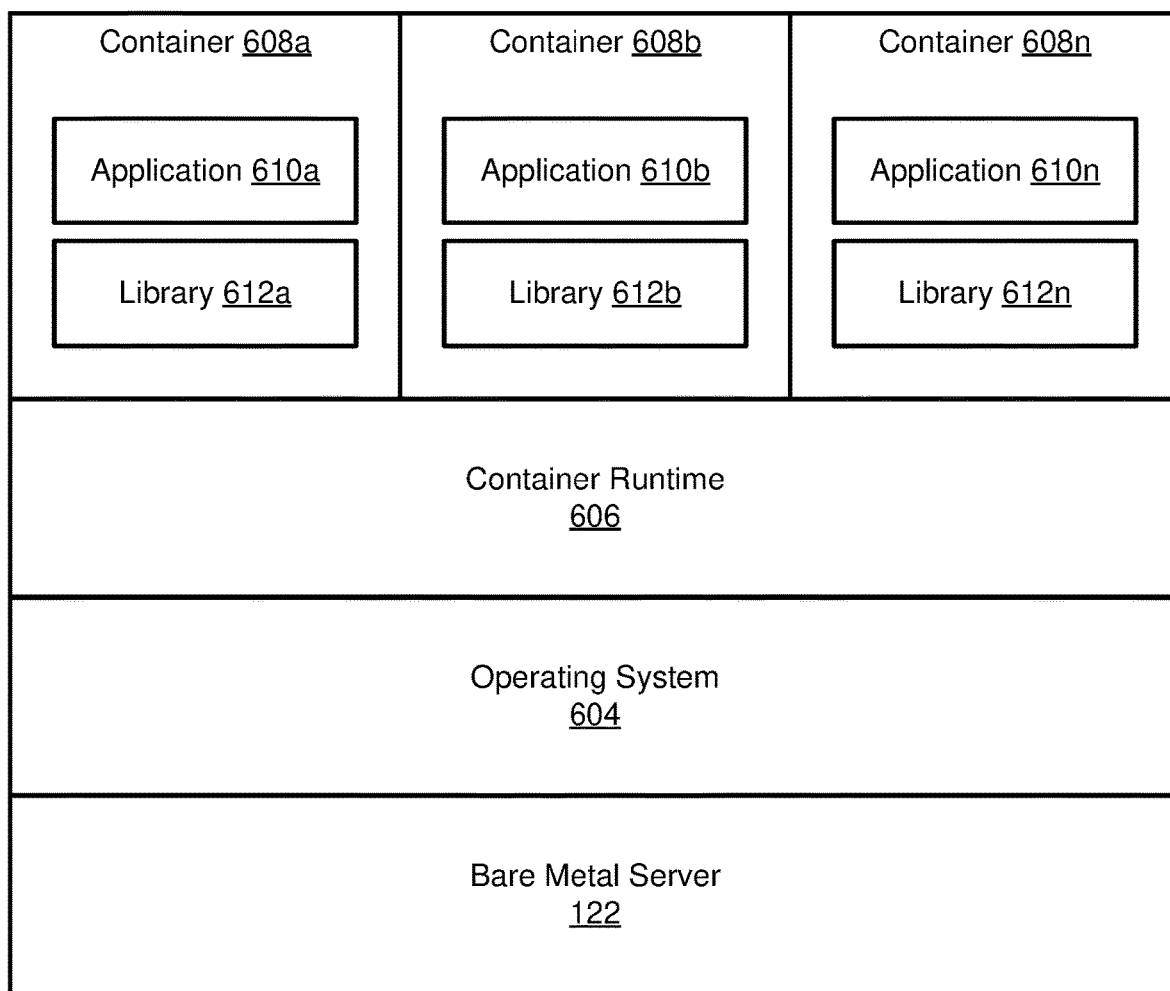
FIG. 6 is a schematic block diagram illustrating a system for managing containerized workloads and services.

FIG. 6 is a schematic diagram illustrating a system 600 for managing containerized workloads and services. The system 600 includes a provisioned bare metal server 122 that supports an operating system 604 and further includes a container runtime 606, which refers to the software responsible for running containers 608. The bare metal server 122 provides processing and storage resources for a plurality of containers 608a, 608b, 608n that each run an application 610 based on a library 612. The system 600 discussed in connection with FIG. 6 is implemented within the systems 400, 500 described in connection with FIGS. 4A-4B and 5.

The containers 608 function similar to a virtual machine but have relaxed isolation properties and share an operating system 604 across multiple applications 610. Therefore, the containers 608 are considered lightweight. Similar to a virtual machine, a container has its own file systems, share of CPU, memory, process space, and so forth. The containers 608 are decoupled from the underlying instruction and are portable across clouds and operating system distributions.

Containers 608 are repeatable and may decouple applications from underlying host infrastructure. This makes deployment easier in different cloud or OS environments. A container image is a ready-to-run software package, containing everything needed to run an application, including the code and any runtime it requires, application and system libraries, and default values for essential settings. By design, a container 608 is immutable such that the code of a container 608 cannot be changed after the container 608 begins running.

The containers 608 enable certain benefits within the system. Specifically, the containers 608 enable agile application creation and deployment with increased ease and efficiency of container image creation when compared to virtual machine image use. Additionally, the containers 608 enable continuous development, integration, and deployment by providing for reliable and frequent container image build and deployment with efficient rollbacks due to image immutability. The containers 608 enable separation of development and operations by creating an application container at release time rather than deployment time, thereby decoupling applications from infrastructure. The containers 608 increase observability at the operating system-level, and also regarding application health and other signals. The containers 608 enable environmental consistency across development, testing, and production, such that the applications 610 run the same on a laptop as they do in the cloud. Additionally, the containers 608 enable improved resource isolation with predictable application 610 performance. The containers 608 further enable improved resource utilization with high efficiency and density.

The containers 608 enable application-centric management and raise the level of abstraction from running an operating system 604 on virtual hardware to running an application 610 on an operating system 604 using logical resources. The containers 604 are loosely coupled, distributed, elastic, liberated micro-services. Thus, the applications 610 are broken into smaller, independent pieces and can be deployed and managed dynamically, rather than a monolithic stack running on a single-purpose machine.

The system 600 allows users to bundle and run applications 610. In a production environment, users may manage containers 608 and run the applications to ensure there is no downtime. For example, if a singular container 608 goes down, another container 608 will start. This is managed by the control plane nodes 406, which oversee scaling and failover for the applications 610.

FIG. 7 is a schematic diagram of a provisioning process 700 for connecting a bare metal server 122 to the system 100. In the implementation illustrated in FIG. 7, the bare metal server 122 communicates over the 5G RAN 102.

The provisioning process 700 includes provisioning the bare metal server 122 with BIOS (basic input output system) configurations 122, firmware upgrades 706, storage configurations 708, network configurations 710, and an operating system 712. The provisioning process 700 further includes provisioning the bare metal server 122 with RPM, drivers, services, and other configurations 714. The provisioning process 700 includes provisioning the bare metal server 122 with an orchestration platform 716, such as the orchestration server system 124 discussed in connection with FIG. 1. The provisioning process 700 includes installing applications 718 on the bare metal server or configuring the bare metal server 122 to execute the applications 718.

Figure 8:
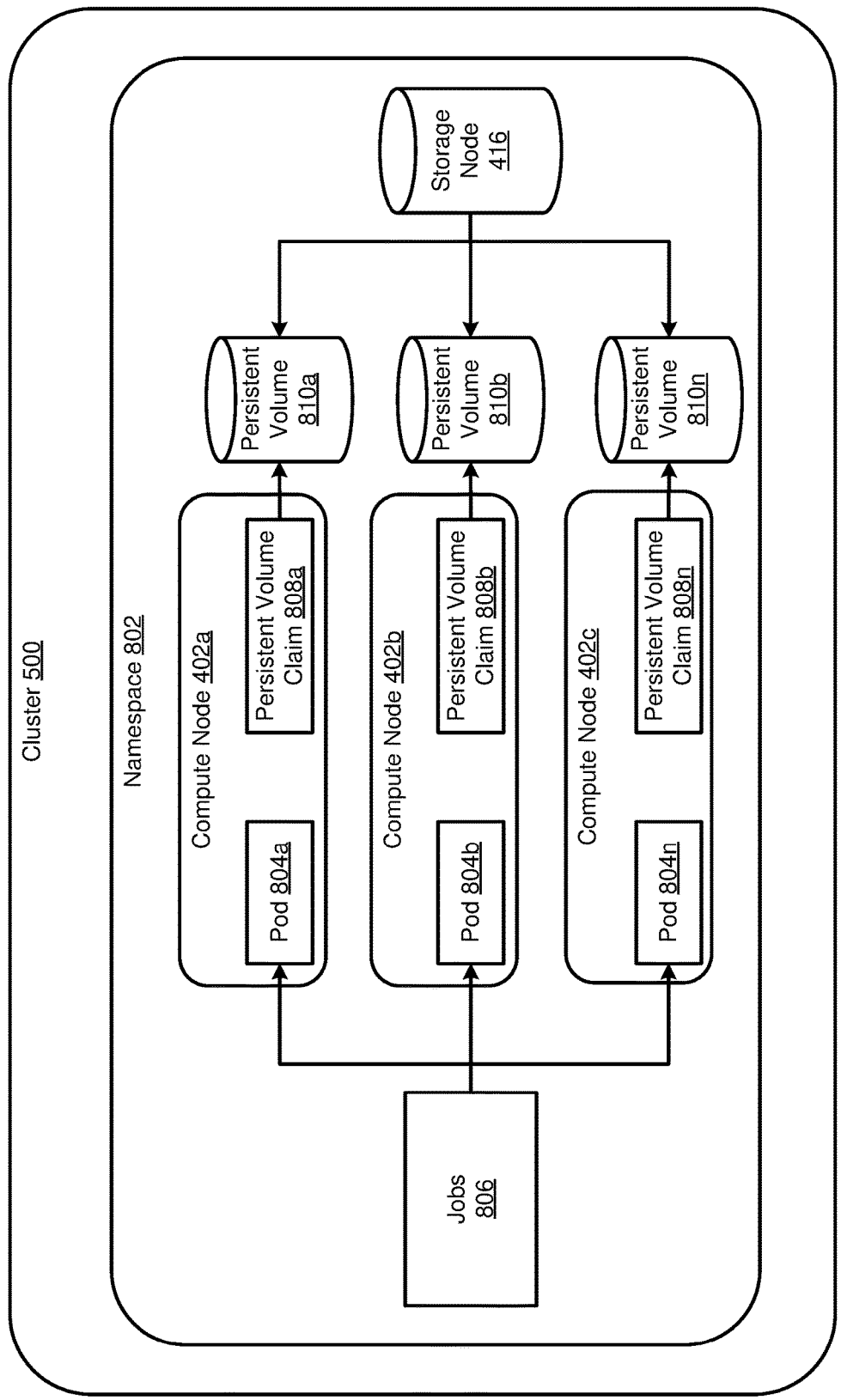
FIG. 8 is a schematic diagram of an example system for executing jobs with one or more compute nodes associated with a cluster.

FIG. 8 is a schematic diagram of an example system 800 for executing jobs with one or more compute nodes associated with a cluster. The system 800 includes a cluster 500, such as the cluster first illustrated in FIG. 2. The cluster 500 includes a namespace 802. Several compute nodes 402 are bound to the namespace 802, and each compute node 402 includes a pod 804 and a persistent volume claim 808. In the example illustrated in FIG. 4, the namespace 802 is associated with three compute nodes 402a, 402b, 402n, but it should be appreciated that any number of compute nodes 402 may be included within the cluster 500. The first compute node 402a includes a first pod 804a and a first persistent volume claim 808a that draws upon a first persistent volume 810a. The second compute node 402b includes a second pod 804b and a second persistent volume claim 808b that draws upon a second persistent volume 810b. Similarly, the third compute node 402n includes a third pod 804n and a third persistent volume claim 808n that draws upon a third persistent volume 810n. Each of the persistent volumes 810 may draw from a storage node 416. The cluster 500 executes jobs 806 that feed into the compute nodes 402 associated with the namespace 802.

Numerous storage and compute nodes may be dedicated to different namespaces 802 within the cluster 500. The namespace 802 may be referenced through an orchestration layer by an addressing scheme, e.g., <Bundle ID>.<Role ID>.<Name>. In some embodiments, references to the namespace 802 of another job 806 may be formatted and processed according to the JINJA template engine or some other syntax. Accordingly, each task may access the variables, functions, services, etc. in the namespace 802 of another task on order to implement a complex application topology.

Each job 806 executed by the cluster 500 maps to one or more pods 804. Each of the one or more pods 804 includes one or more containers 608. Each resource allocated to the application bundle is mapped to the same namespace 802. The pods 804 are the smallest deployable units of computing that may be created and managed in the systems described herein. The pods 804 constitute groups of one or more containers 608, with shared storage and network resources, and a specification of how to run the containers 608. The pods' 804 contents are co-located and co-scheduled and run in a shared context. The pods 804 are modeled on an application-specific "logical host," i.e., the pods 804 include one or more application containers 608 that are relatively tightly coupled.

The pods 804 are designed to support multiple cooperating processes (as containers 608) that form a cohesive unit of service. The containers 608 in a pod 804 are co-located and co-scheduled on the same physical or virtual machine in the cluster. The containers 608 can share resources and dependencies, communicate with one another, and coordinate when and how they are terminated. The pods 804 may be designed as relatively ephemeral, disposable entities. When a pod 804 is created, the new pod 804 is schedule to run on a node in the cluster. The pod 804 remains on that node until the pod 804 finishes executing, and then the pod 804 is deleted, evicted for lack of resources, or the node fails.

The system 800 is valuable for applications that require one or more of the following: stable and unique network identifiers; stable and persistent storage; ordered and graceful deployment and scaling; or ordered and automated rolling updated. In each of the foregoing, "stable" is synonymous with persistent across pod rescheduling. If an application does not require any stable identifiers or ordered deployment, deletion, or scaling, then the application may be deployed using a workload object that provides a set of stateless replicas.

Figure 9:
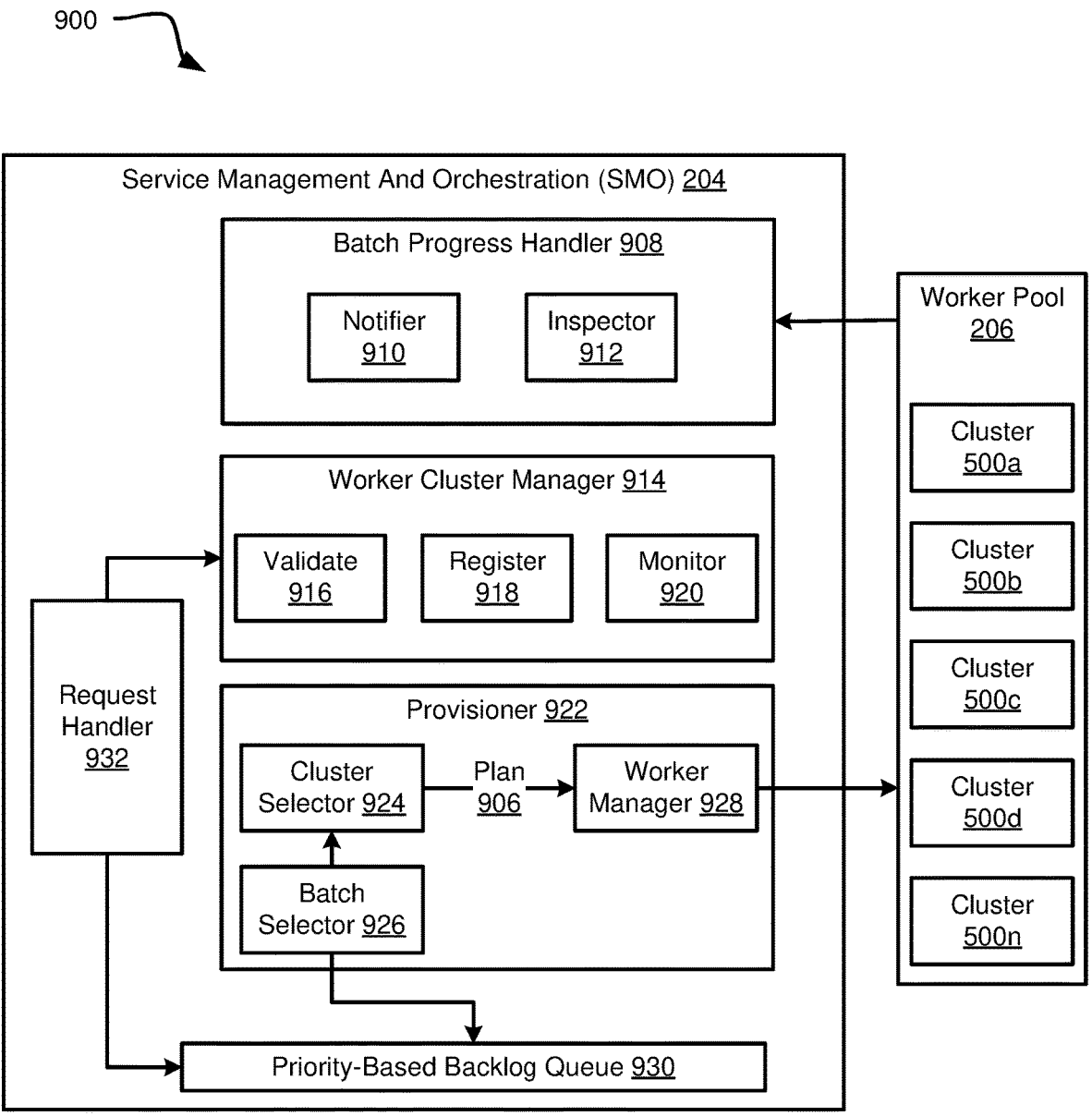
FIG. 9 is a schematic diagram of an example system deploying a service management and orchestration platform.

FIG. 9 is a schematic diagram of an example system 900 deploying a service management and orchestration (SMO) 204 platform. The system 900 is capable of registering clusters for batch execution by specifying the maximum limit in terms of the number of workers and/or the allocation of compute and storage resources. The SMO 204 communicates with one or more worker pool 206 and identifies at least one of those clusters 500a-500n to execute each batch of tasks (may be referred to as a "batch" herein). The plurality of clusters 500a-500n depicted in FIG. 9 may collectively be referred to as clusters 500 or "worker clusters" as discussed herein. The clusters 500 allocate compute node 402 resources. The various worker pool 206 may be distributed across one or more data centers located in different geographic regions.

The SMO 204 includes a batch progress handler 908, a worker cluster manager 914, a provisioner 922, and a request handler 932. The SMO 204 provisions a plurality of tasks queued within a priority-based backlog queue 930 to various clusters 500 within the bank of worker pool 206.

When a batch of tasks is submitted to the SMO 204, each of the plurality of tasks is first sent to the priority-based backlog queue 930. The provisioner 922 monitors the priority-based backlog queue 930 and selects tasks for execution based on the priority. In some implementations, a user provides task priority. Different worker types may be required to execute different jobs, and the jobs will be prioritized to leverage existing workers before tearing down and creating a worker. In an example implementation, the priority-based backlog queue 930 includes three tasks, namely task J1, which is required and must be performed by WorkerType1; task J2, which requires WorkerType2; and task J3, which is required and must be performed by WorkerType1. The provisioner 922 determines it would be preferable to execute J1, J3, and then J2, rather than execute J1, J2, and then J3. For executing task J1, the system creates WorkerType1. For executing task J2, the system destroys WorkerType1 and creates WorkerType2 (assuming the system has capacity only to create one worker). For executing task J3, the system destroys WorkerType2 and re-instantiates WorkerType1. This destroy and create cycle will consume cycles and slow down the overall execution.

The provisioner 922 selects tasks from the priority-based backlog queue 930 and then forwards those tasks to eligible clusters 500 within the bank of worker pool 206. When one of the clusters 500a-500n receives a task or batch of tasks, that clusters 500a-500n will then provide the task(s) to various compute nodes 402a-402n as shown in FIG. 2.

The provisioner 922 continuously monitors the batch selection (with the batch selector 924 component) until completion. The provisioner 922 load balances the allocation of tasks to different clusters 500a-500n within the bank of worker pool 206. The provisioner 922 implements static specification of resources and may also implement dynamic provisioning functions that invoke allocation of resources in response to usage. For example, as a database fills up, additional storage volumes may be allocated. As usage of compute resources are allocated, additional processing cores and memory may be allocated to reduce latency.

The provisioner 922 adjusts desired worker counts for different clusters 500. This adjusts the pod 804 count on the nodes within each cluster 500. The provisioner 922 includes a batch selector 926 that reads the batches within the priority-based backlog queue 930. The batch selector 926 prioritizes the highest priority batches and then provides each batch of tasks to a cluster selector 924 based on priority. The priority of the batches within the priority-based backlog queue 930 may be dynamic such that priority is adjusted in real-time based on various factors. This may be performed based on user triggers. For example, if a critical and time-bound job 406 is sitting within the priority-based backlog queue 930, a user might change the priority of this job 406 to ensure it gets ahead within the queue 930. Some jobs are time-bound. For example, maintenance jobs may be required to complete before 3:00 AM.

The cluster selector 924 is responsible for identifying compute resources to complete the batch requests. The cluster selector 924 identifies a cluster 500 to execute each batch of tasks. One or more of the available clusters 500 within the bank of worker pool 206 may be located at data centers in different geographic locations. For example, cluster 500a might be located at a data center on the East Coast of the United States, cluster 500*b* might be located at a data center on the West Coast of the United States, cluster 500*c* might be located at a data center in India, cluster 500*d* might be located at a data center in Europe, cluster 500*n* might be located at a data center in Korea, and so forth.

The worker manager 928 receives the plan 906 and is then responsible for creating new workers or selecting existing workers. In some implementations, each of the workers is a pod 406 within a KUBERNETES® cluster 500. The worker manager 928 may additionally steal idle workers from other profiles.

The request handler 932 manages batch requests from users by validating requests and queuing those requests for processing by the worker cluster manager 914. The batch requests may include different types of tasks that will be allocated based on the cluster allocation priority algorithm 602 discussed in connection with FIG. 6. The worker cluster manager 914 is responsible for new registration of clusters 500*a*-500*n* and monitoring the health of the clusters 500*a*-500*n*. Specifically, the worker cluster manager 914 validates 916, registers 918, and monitors 920 the clusters 500*a*-500*n*.

The batch progress handler 908 includes a notifier 910 component and an inspector 912 component. As different pools of the batch of tasks are completed, the next set of pools are scheduled to the worker pool 206. If any of the assigned clusters 500*a*-500*n* are unhealthy, then cluster selection is performed again to re-plan the desired counts for the remaining clusters to complete the remaining batches of tasks. Completed batches have either success or failure status as determined by the inspector 912. The notifier 910 notifies the subscribers of the success or failure status of the various batches through different notification channels.

Figure 10:
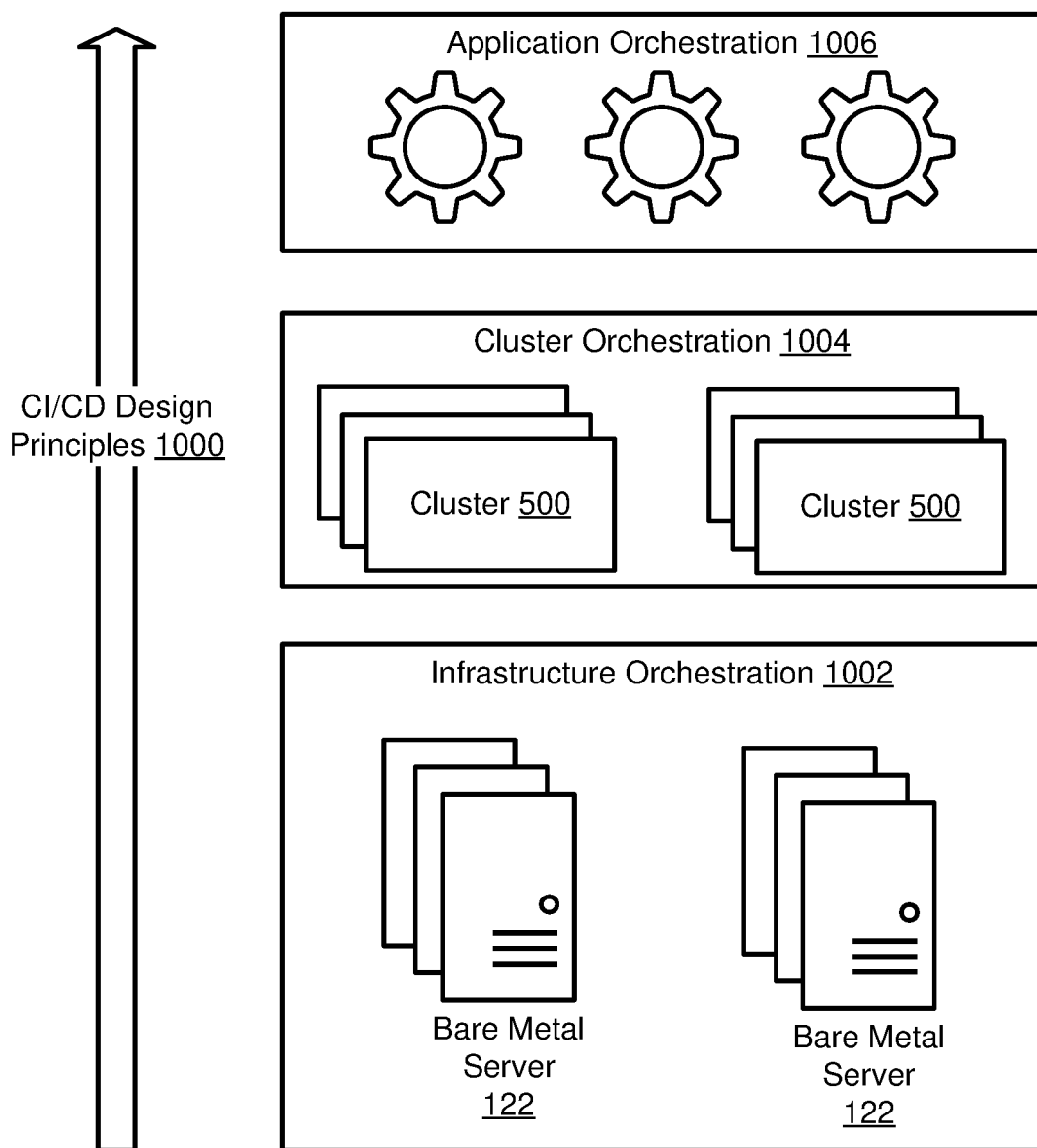
FIG. 10 is a schematic diagram of CI/CD (continuous integration/continuous delivery) design principles.

FIG. 10 is a schematic diagram of CI/CD (continuous integration/continuous delivery) design principles 1000. The CI/CD design principles 1000 begin with infrastructure orchestration 1002, which may include an orchestration of bare metal servers in communication with a cloud network. The cluster orchestration 1004 is built upon and executed by the infrastructure orchestration 1002. The application orchestration 1006 includes one or more applications that are executed by clusters 500 of the cluster orchestration 1004.

The systems, methods, and devices described herein for life cycle management operations using GitOps are deployed for infrastructure orchestration 1002, cluster orchestration 1004, and application orchestration 1006. Architecturally, GitOps enables separation of the continuous integration (CI) flow of an application from the deployment process for the application. The deployment process kicks off based on changes to a GitOps repo, rather than as part of the CI process.

Figure 11:
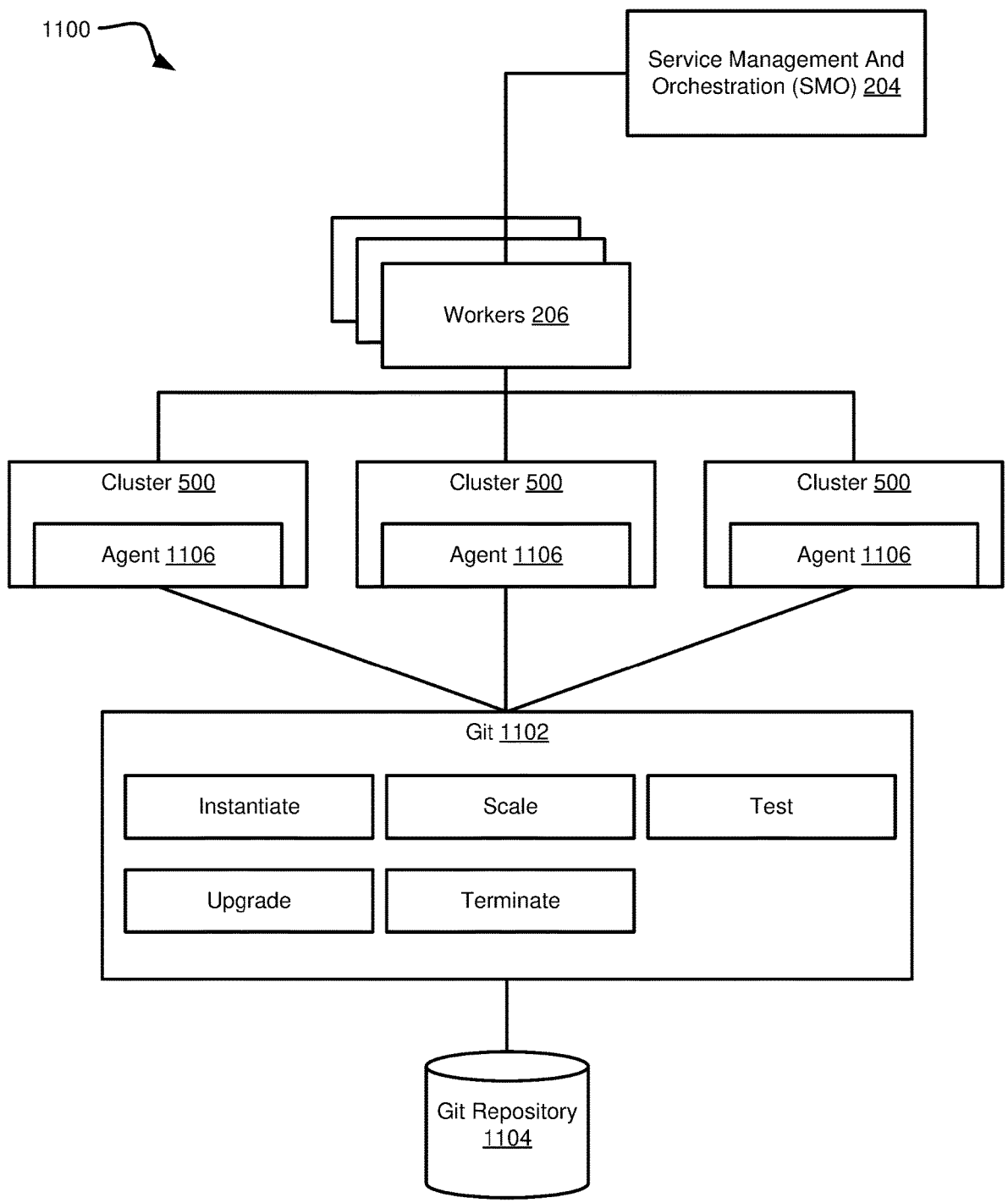
FIG. 11 is a schematic block diagram of a system known in the prior art for continuous delivery of an application orchestration.

FIG. 11 is a schematic block diagram of a system 1100 known in the prior art for continuous delivery of an application orchestration 1006. The system 1100 experiences several drawbacks and is not desirable in most implementations, particularly due to security concerns and high computational cost. The system 1100 cannot be used for continuous delivery infrastructure orchestration 1002 or cluster orchestration 1004 and is instead limited to continuous delivery of an application orchestration 1006. The numerous drawbacks associated with the system 1100 are largely addressed by the improved systems, methods, and devices described herein, and specifically those described in connection with FIGS. 12-18.

The system 1100 includes the SMO 204 in communication with a plurality of workers 206 that are instructed to execute a continuous delivery (CD) program. The system 1100 implements orchestration through GitOps using an agent 1106 (i.e., the continuous delivery program) installed on a cluster 500 as an operator. The agent 1106 consumes a significant CPU and memory footprint on the cluster 500. For far-edge cluster use cases, this is not ideal and takes away resources that could be used by DU (distributed unit) and CU (centralized unit) applications of a 5G network stack.

An instance of the agent 1106 is installed on each of a plurality of clusters 500. In an example implementation, the agent 1106 is FLUX® or ArgoCD®. The agent 1106 may be installed on a cluster 500 along with a HELM controller, a KUSTOMIZE controller, a notification controller, a source controller, and an image controller. The agent 1106 is a tool for keeping clusters 500 coordinated with sources of configuration such as a git repository 1104. The agent 1106 is further used for automating updates to a configuration when there is new code to deploy. The agent 1106 may be built upon the API server 408 integrated within the systems described herein.

Git 1102 is an open-source and distributed version control system for tracking changes in a set of files and may specifically be used for coordinating work among programmers collaboratively developing source code during software development. git 1102 seeks to provide speed, data integrity, and support for distributed, non-linear workflows (i.e., numerous parallel branches running on different systems).

The git repository 1104 functions as a file server that tracks and saves the history of all changes made to files within a project, such as a project for managing one or more of an infrastructure orchestration 1002, cluster orchestration 1004, and/or application orchestration 1006. The git repository 1104 may be either private or public. The git repository 1104 includes a complete history and full version-tracking abilities stored independent of network access or a central server.

As discussed above, the system 1100 illustrated in FIG. 11 comes with a number of drawbacks. Specifically, for certain deployments, like those utilizing edge RAN clusters, the CPU and memory consumption for the system 1100 is high. Specifically, each of the source controller, HELM controller, KUSTOMIZE controller, notification controller, image automation controller, and image reflector controller may consume significant CPU and memory requirements that will make the system 1100 computationally expensive overall. In some cases, the system 1100 may require from about 0.5 compute cores to about six compute cores, which is unacceptable in most implementations.

Additionally, the system 1100 may be implemented for continuous delivery of application orchestrations 1006 only, and not for infrastructure orchestrations 1002 or cluster orchestrations 1004. The system 1100 cannot be implemented to perform life cycle management operations such as provisioning, upgrades, security, configuration, and enabling observability on an infrastructure. The system 1100 further cannot be implemented to perform life cycle management operations such as provisioning, upgrades, scaling, configuration, and enabling observability on a cluster. Additionally, when a configuration change detection is not done through the agent 1106, the configuration change must be built with another tool and then reconciled with the agent 1106, and this consumes additional computational resources.

The system 1100 introduces security concerns that may be deemed unacceptable for many clients. The agents 1106 are granted read and write access to their corresponding clusters 500. This enables a user to enable write access with git 1102 authorization tokens. The agents 1106 typically write metadata information into the git repository 1104. The read and write access granted to the agents 1106 is a major security concern for most organizations.

Additionally, the system 1100 cannot provide data protection capabilities to applications. With traditional HELM-based applications registered on the git repository 1104, it is not possible to perform data protection operations like snapshot, clone, rollback, and backup of an application. Additionally, the system 1100 cannot be utilized to extend functionality to SMO 204 elements like Postgres, SQL, and others.

Additionally, the system 1100 requires the SMO 204 to regularly poll the agents 1106 or git 1102 at a regular interval. git 1102 check-in payloads are complex and making sense of these payloads by parsing them out is tedious and computationally expensive. For this reason, the system 1100 is highly inefficient due to its use of the polling method where the GitOps operator polls the git repository 1104 for any check-ins based on an interval.

Thus, the system 1100 illustrated in FIG. 11 is associated with numerous drawbacks and may not be desirable in some implementations. Many of the drawbacks associated with the system 1100 are addressed by the systems discussed in connection with FIGS. 12 and 13, below.

Figure 12:
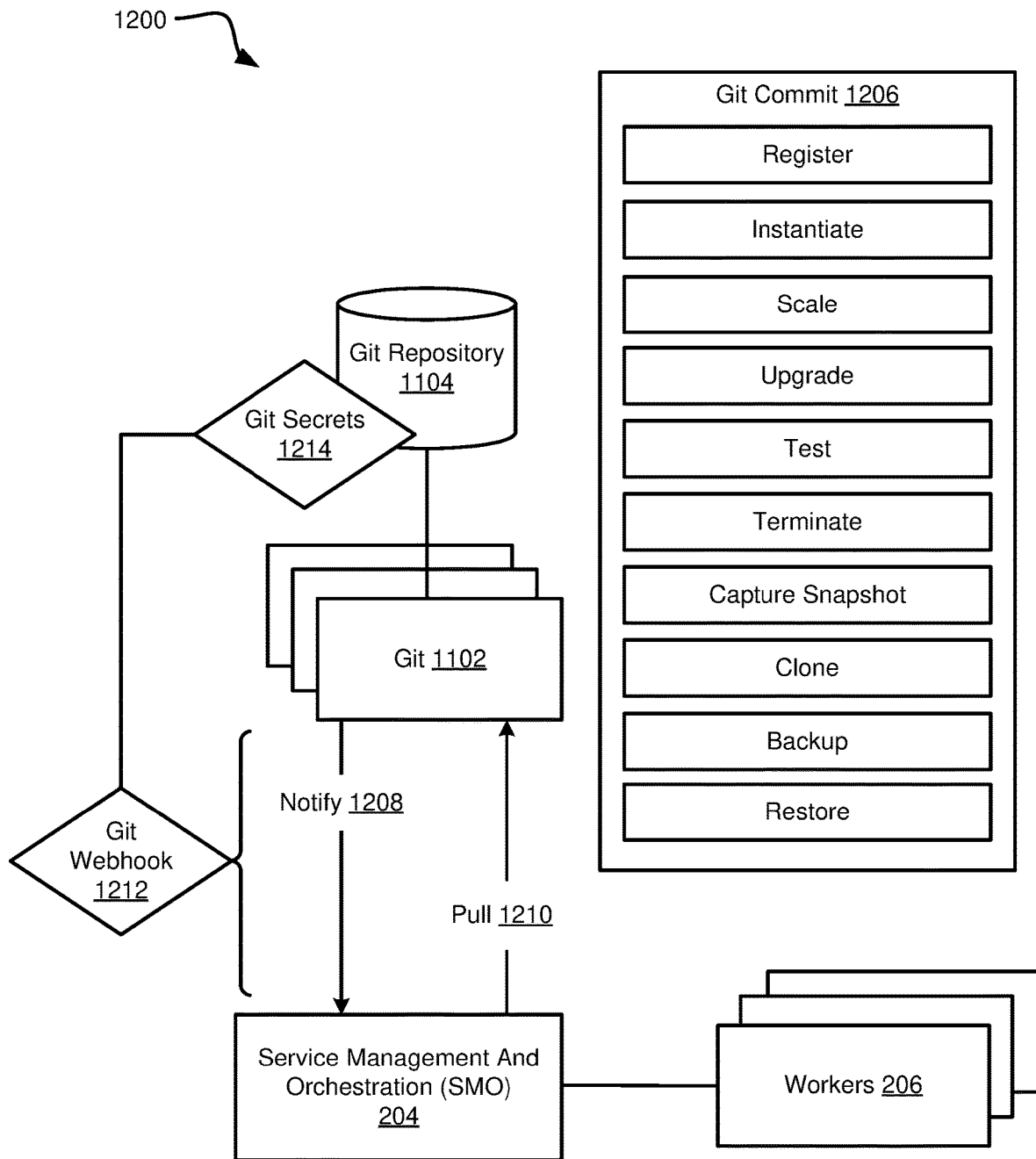
FIG. 12 is a schematic block diagram illustrating communications between a service management and orchestration platform and a git repository for implementing functions and process flows for CI/CD of infrastructure orchestrations, cluster orchestrations, and application orchestrations.
Figure 13:
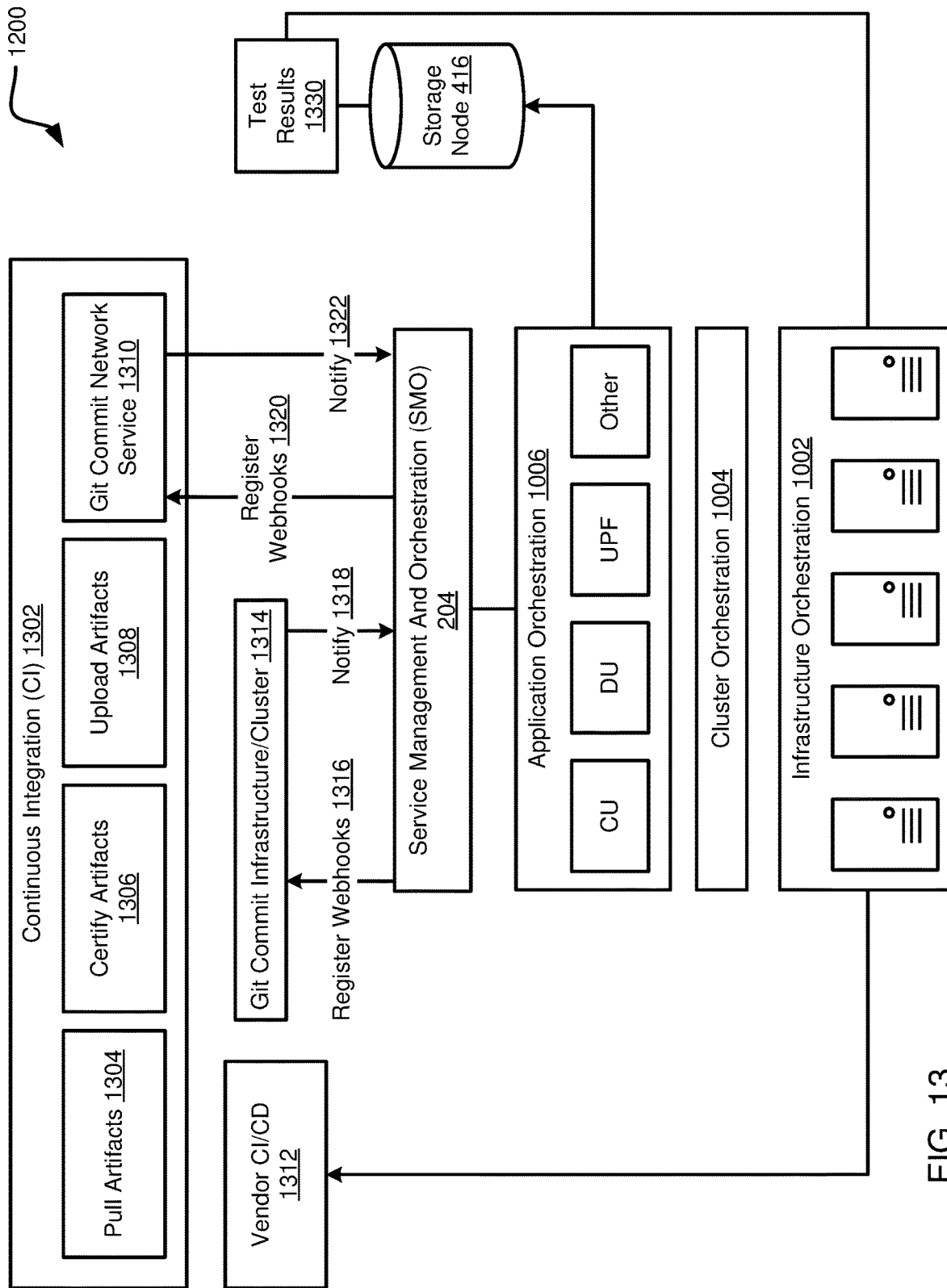
FIG. 13 is a schematic block diagram of a system for implementing functions and process flows for CI/CD of infrastructure orchestrations, cluster orchestrations, and application orchestrations.

FIGS. 12 and 13 are schematic block diagrams of a system 1200 for continuous delivery and continuous integration of infrastructure orchestrations 1002, cluster orchestrations 1004, or application orchestrations 1006. FIG. 12 is a schematic block diagram illustrating communications between the SMO 204 and a git repository 1104 for implementing the functions and process flows discussed in connection with FIG. 13.

The system 1200 includes the SMO 204 in communication with a plurality of workers 206, which may include clusters 500 or compute nodes 402 as described herein. The SMO 204 may be a component of an automation platform that may function across multiple data centers. The SMO 204 may execute on a cloud platform or as a logic control module. The SMO 204 is further in communication with a git repository 1104. The git repository 1104 is implemented by git 1102, which is a distributed version control system for tracking changes in a set of files.

The system 1200 is implemented for continuous deployment and continuous testing integration with SMO (service management and orchestration) using GitOps, which requires a private or public git repository 1104. GitOps is a set of practices to manage infrastructure and application configurations using git 1102, which is an open-source version control system. GitOps is built around the developer experience and helps teams manage infrastructure using the same tools and processes they use for software development. In the git repository 1104, users commit spec files in YAML format called CR (custom resource). The CR files describe applications, infrastructure, and cluster orchestrations. The SMO 204 provides operations for complete life cycle management of infrastructures, clusters, and applications along with the ability to run tests and analyze test results.

The custom resource (CR) is any object that describes an application and the infrastructure on which the application runs. The system 1200 implements the YAML format to describe the CR. The CR includes each of the following keys: an API version (string) that describes the version of the CR; a kind (string, single word) that describes the type of infrastructure, cluster, or application CR; metadata (map) that describes key/value pairs for storing metadata for the CR; and a specification (map) that describes key/value pairs for storing the actual CR specification.

In an implementation wherein the system 1200 is implemented in a containerized workload management system such as KUBERNETES®, each of the infrastructure orchestration 1002, the cluster orchestration 1004, and/or the application orchestration 1006 are described in the format of the CR as a custom KUBERNETES® YAML file. The SMO 204 serves as an end-to-end orchestration software that understands and interprets these YAML CR files. The declarative design pattern of the cluster-based system is adopted to perform various life cycle management operations. The communication mechanism between the SMO 204 and the git repository 1104 is enabled through git webhooks 1212 that are secured through git secrets 1214. The git secrets 1214 are generated as part of the git repository 1104 registration process, wherein a unique token per-user per-git repository 1104 is auto-generated, and then this token is used for encoding the request body using the git secret 1214 framework available through GitHub.

The SMO 204 instructs one or more workers 206 to execute one or more possible git commit 1206 commands in response to pulling an event from the git repository 1104. The git commit 1206 commands may include any of the examples illustrated in FIG. 12, along with other commands not discussed herein. Example git commit 1206 commands include registering, instantiating, scaling, upgrading, testing, terminating, capturing a snapshot of, cloning, backing up, or restoring one or more components of an infrastructure, cluster, or application.

The system 1200 functions with the use of git webhooks 1212. The git webhooks 121 are SMO REST APIs registered to the git repository 1104. The system 1200 enables a user to provide read-only tokens to the git repository 1104 from the SMO 204 during registration. This works because the SMO 204 uses the token only in those cases where communication to the git repository 1104 is lost (e.g., for reconciliation purposes). The read-only token reduces security risks and resolves many of the security risks associated with the system 1100 described in FIG. 11.

The git webhook 1212 enables the SMO 204 to subscribe to certain events published by git 1102. When an event is triggered, a CR file is sent to a URL configured for the git webhook 1212, and git 1102 notifies at 1208 the SMO 204 of the new payload. The SMO 204 then pulls the payload at 1210. The git webhook 1212 is configured to send CR files for certain events applicable to the management of the infrastructure orchestration 1002, the cluster orchestration 1004, or the application orchestration 1006. The SMO 204 is not required to periodically poll the git repository 1104 because the git webhook 1212 configures git 1102 to automatically notify 1208 the SMO 204 when a new event occurs.

The system 1200 avoids complex parsing of git 1102 check-in payloads to interpret if a user did a check-in to either add a file, update a file, or delete a file. The SMO 204 proposes a solution like git 1102 tags, which serve as pre-known tags that a user may use during check-in to execute a specific life cycle management operation.

After the SMO 204 pulls at 1210 a CR file published by the git repository 1104, the SMO 204 may then instruct one or more workers 206 to execute a workflow or worker pattern to materialize the git commit 1206. The system 1200 eliminates the need for an agent 1106 running on a cluster 500 (as described in FIG. 11) to perform operations for the infrastructure orchestration 1002, the cluster orchestration 1004, or the application orchestration 1006. The persistent worker 206 pools are similar to a thread pool but implemented within a containerized workload management system such as the ones described herein.

As part of GitOps design principles, the SMO 204 is connected to one or more git repositories 1104. There are two ways the SMO 204 is presented with one or more CRs to work on. The SMO 204 may be notified of the payload at 1208 through the git webhook 1212, and the pull the new payload at 1210. Alternatively, the SMO 204 may periodically pol the git repository 1140 for any updates and then clone the git repository 1104. The SMO 204 may report git repository 1104 polling at a minimum with a configurable cadence to protect against the git 1102 failing to provide all notifications 1208. To track user commits to the git repository 1104 through notifications, the SMO 204 implements the necessary algorithm within a git webhook 1212 to figure out file addition, file deletion, or file updates. In any case, the git repository 1104 is presented to the SMO 204 as read-only, i.e., the SMO 204 cannot write to a registered git repository 1104 to reduce security concerns.

Users can structure the CRs within the git repository 1104 in any number of ways. The git repository 1104 is a simple directory and file structure. To streamline GitOps, a user may adhere to a git repository 1104 structure for compatibility. Any reference cone in the YAML CR files for additional sets of files and directories shall be either from the root of the git repository 1104 or its relative path. For example, if a 5G core HELM NFP needs sample values.yaml file, it could be referenced as /src/testing/5gcore/sandbox/values.yaml or 5gcore/staging/values.yaml.

The system 1200 implements continuous integration (CI) 1302 operations, which include pulling artifacts 1304, certifying artifacts 1306, and uploading artifacts 1308. The system 1200 includes a git commit infrastructure/cluster 1314 in communication with a module for service management and orchestration 1324, which is a component of the SMO 204. The SMO 204 registers webhooks at 1316 with the git commit infrastructure/cluster 1314. The git commit infrastructure/cluster 1314 then notifies at 1318 the SMO 204 when new events occur on any of the infrastructure orchestration 1002, the cluster orchestration 1004, or the application orchestration 1006. The SMO 204 registers webhooks at 1320 with the git commit network service 1310. The git commit network service 1310 notifies at 1322 the SMO 204 when new events occur on any of the infrastructure orchestration 1002, the cluster orchestration 1004, or the application orchestration 1006.

The process of registering the webhooks at 1316 and 1320 involves registering using a REST API configured to execute standard operations. The REST API operations may include registering a new private or public git repository 1104, unregistering a specific git repository 1104, reconciling or synchronizing the SMO 204 with latest updates to a registered git repository 1104, retrieving information about a registered git repository 1104, and showing a list of all registered git repositories 1104.

The application orchestration 1006 includes any applications executed by the systems described herein and may specifically include applications for communicating with a 5G RAN 102 or 5G core network 112 as described herein. In the example illustrated in FIG. 13, the application orchestration 1006 specifically includes CU (centralized unit), DU (distributed unit), and UPF (user plane function) applications for a 5G stack.

The system 1200 supports running applications that are either CNF (cloud-native network functions) or VNF (virtual network functions). The default infrastructure for running CNF is KUBERNETES® and the default infrastructure for running VNF is HYPERVISOR. There are many different types of KUBERNETES® offerings, and virtualization offerings, and the system 1200 supports each of them. In the case of managing infrastructure orchestration 1002, the infrastructure CR file includes: connectors that describe how the SMO 204 connects to the infrastructure for performing application life cycle management; and a configuration that describes the structure of the infrastructure in detail.

The system 1200 supports at least three types of application CRs for managing the application orchestration 1006. The system 1200 specifically supports an NFP (network function package), NF (network function), and NS (network service). The NFP may be applied to CNF and/or VNF applications, which may be packaged in many different ways so they may be deployed and managed on infrastructure in an efficient manner. The NFP describes the type of application packaging with details so the SMO 204 can use relevant tools and libraries to manage applications. The NF is the actual CNF/VNF running on the infrastructure orchestration 1002. Thus, the NF is a combination of the NFP and exactly one infrastructure. The NS includes many different market segments and applications deployed across layers of infrastructure stack to provide a service. The NS CR describes one or more network functions.

The SMO 204 is presented with CRs to work on either for NFP registration or NF onboarding. The actual operations (see git commits 1206) may take a few seconds to several minutes to complete. The SMO 204 supports synchronous and asynchronous modes of operation. Synchronous operations are as simple as responding to REST API requests with standard HTTP status codes to indicate success or failure. This is performed with the necessary payload to describe the operation. Asynchronous operations are used for long-running operations like NF onboarding, which may take tens of seconds to several minutes depending on various factors including, for example, connectivity, image scanning, image download, and so forth. In such cases, the SMO 204 implements a means to provide caller with tracker identification for progress, updates, and results.

In most cases, continuous testing is an integral part of the development process. The same GitOps principles used for applications applies to testing clusters and infrastructures as well. Tests for CNF/VNF can be written in any programming language. Any existing test framework, library, or tools may be used as long as they generate success or failure and generate lots and test reports (see test results 1330). The SMO 204 executes tests based on identifiers provided during registration. For test execution tracking, the SMO 204 shall provide a tracker identifier which may be used to query the status of the test, and additionally shall notify the user when text execution is complete, and further shall provide the test results 1330 to the user. The SMO 204 supports notifications on test executions or any execution of asynchronous operations. The notifier may use this notification for execution of a next set of tests.

Figure 14A:
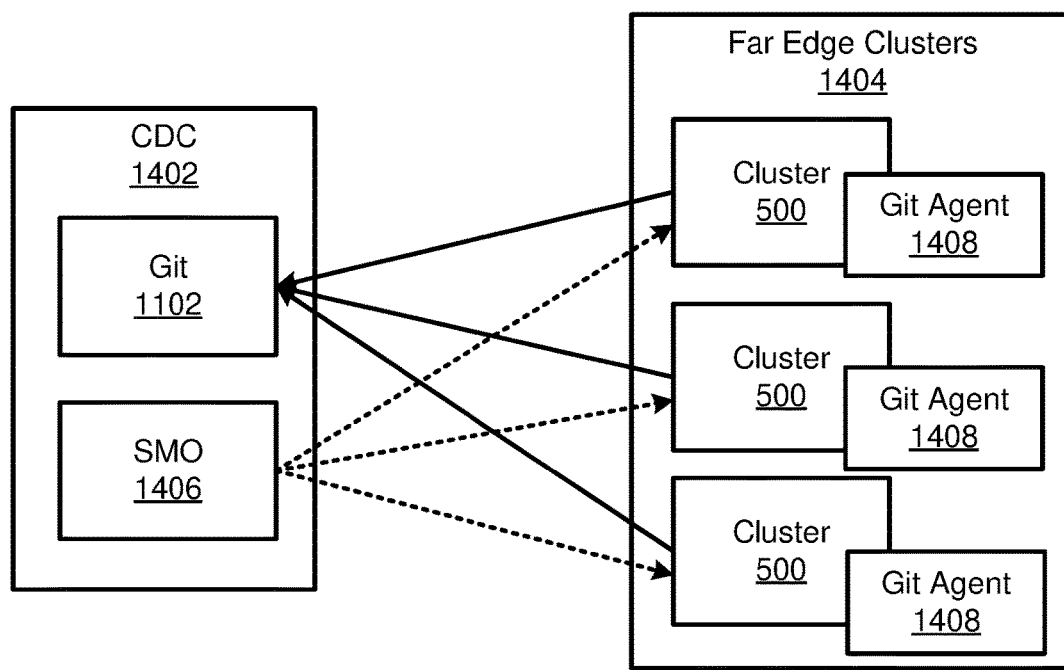
FIG. 14A is a schematic illustration of a prior art system for communicating with a git repository.
Figure 14B:
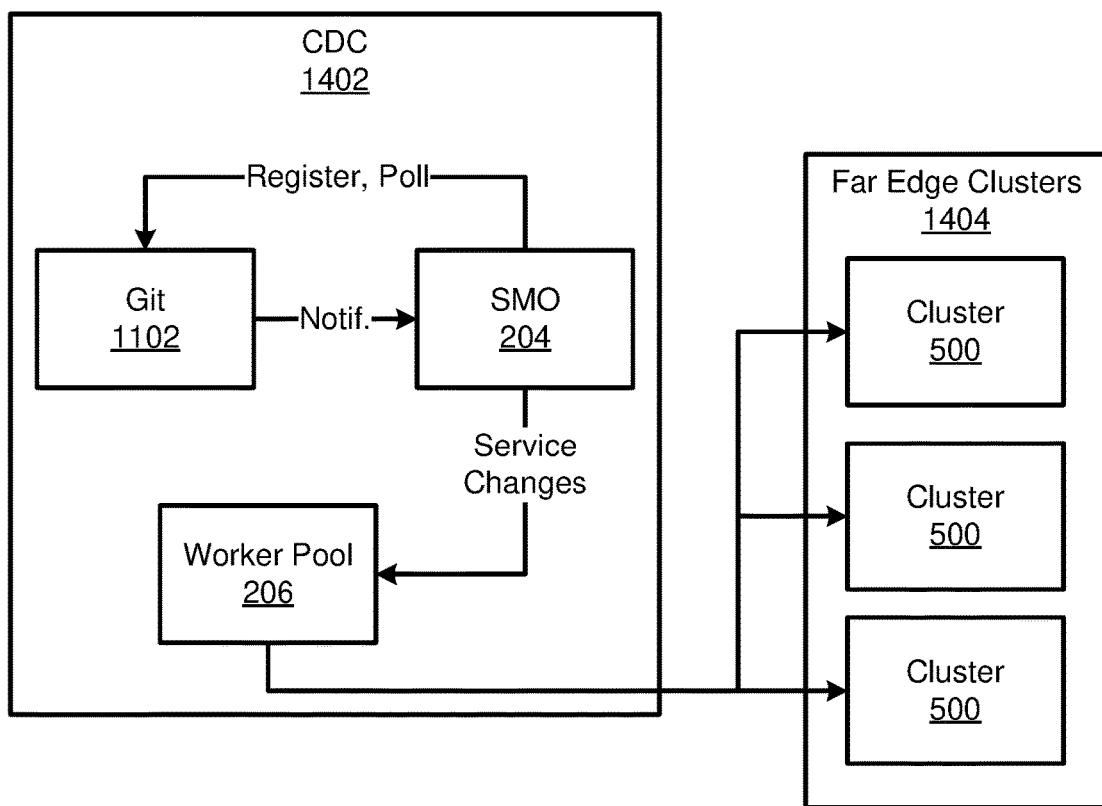
FIG. 14B is a schematic illustration of a system for communicating with a git repository without running git agents on clusters.

FIGS. 14A and 14B are schematic illustrations of systems and process flows for high level network connectivity between far edge clusters, SMO (service management and orchestration), and the central data center (CDC) 1402.

A prior art implementation is illustrated in FIG. 14A, wherein two ports are opened between far edge clusters 1404 and the CDC 1402, including one port opened for SMO 1406 and another port opened for git 1102. As shown in FIG. 14A, the git 1102 requires that a git agent 1408 runs on each of the clusters 500 within the batch of far edge clusters 1404. Each of the git agents 1408 consumes CPU, memory, and storage resources on the associated cluster 500. This can be highly disruptive and represents an inefficient use of resources, particularly when applied to far edge clusters 1404.

FIG. 14B illustrates an improvement to the implemented illustrated in FIG. 14A, wherein there is only one port opened between the far edge clusters 1404 and the CDC 1402. This same port is also used for O2 interfaces (i.e., how SMO 1406 communicates with the O-Cloud it resides in). SMO 1406 directly connects with the git 1102 system which is running in the same CDC 1402 cluster. Notifications between git 1102 and SMO 1406 are within the network scope of the cluster and less prone to losses.

Figure 15:
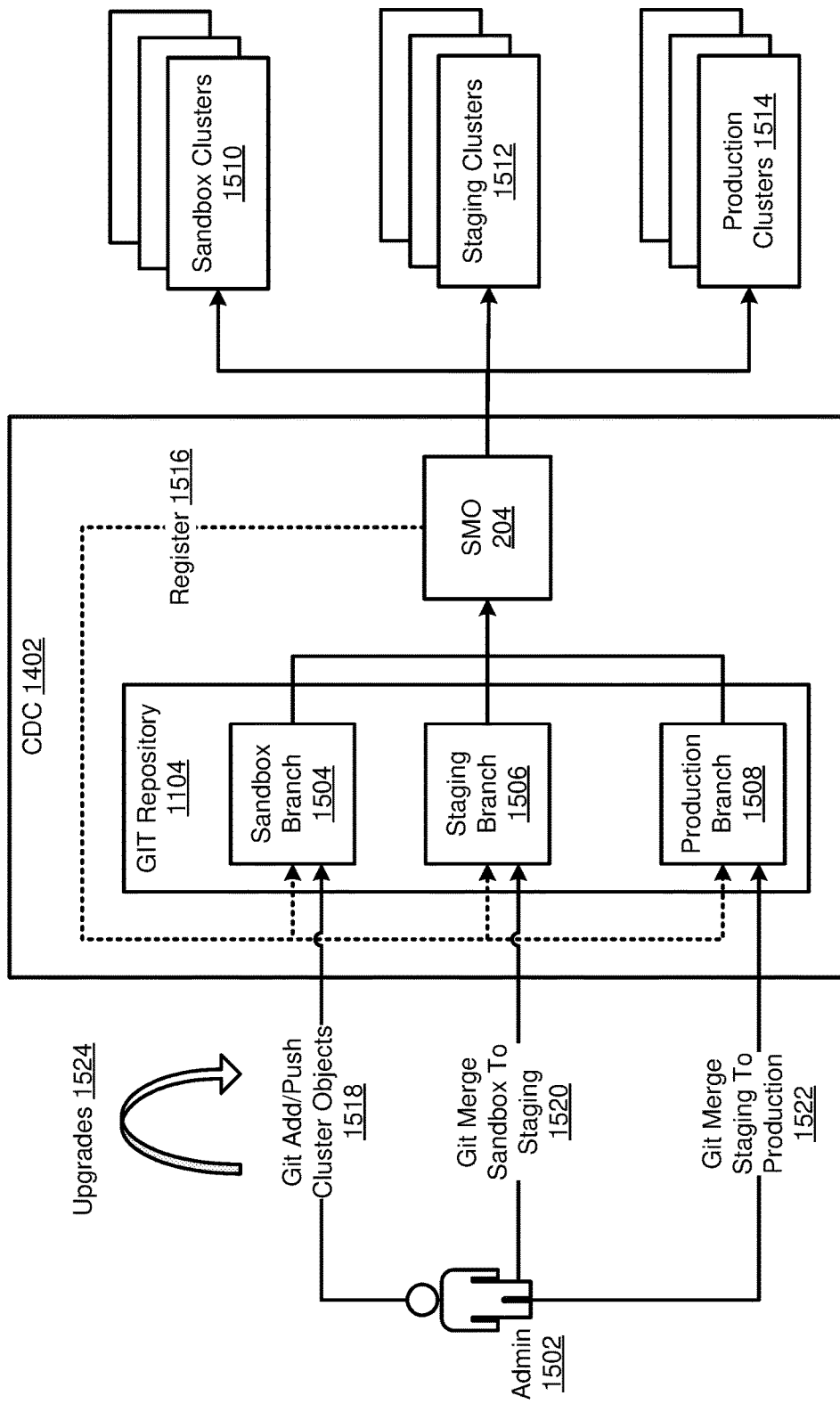
FIG. 15 is a schematic diagram of a system and process flow for continuous delivery of infrastructure orchestration and cluster orchestration.
Figure 16:
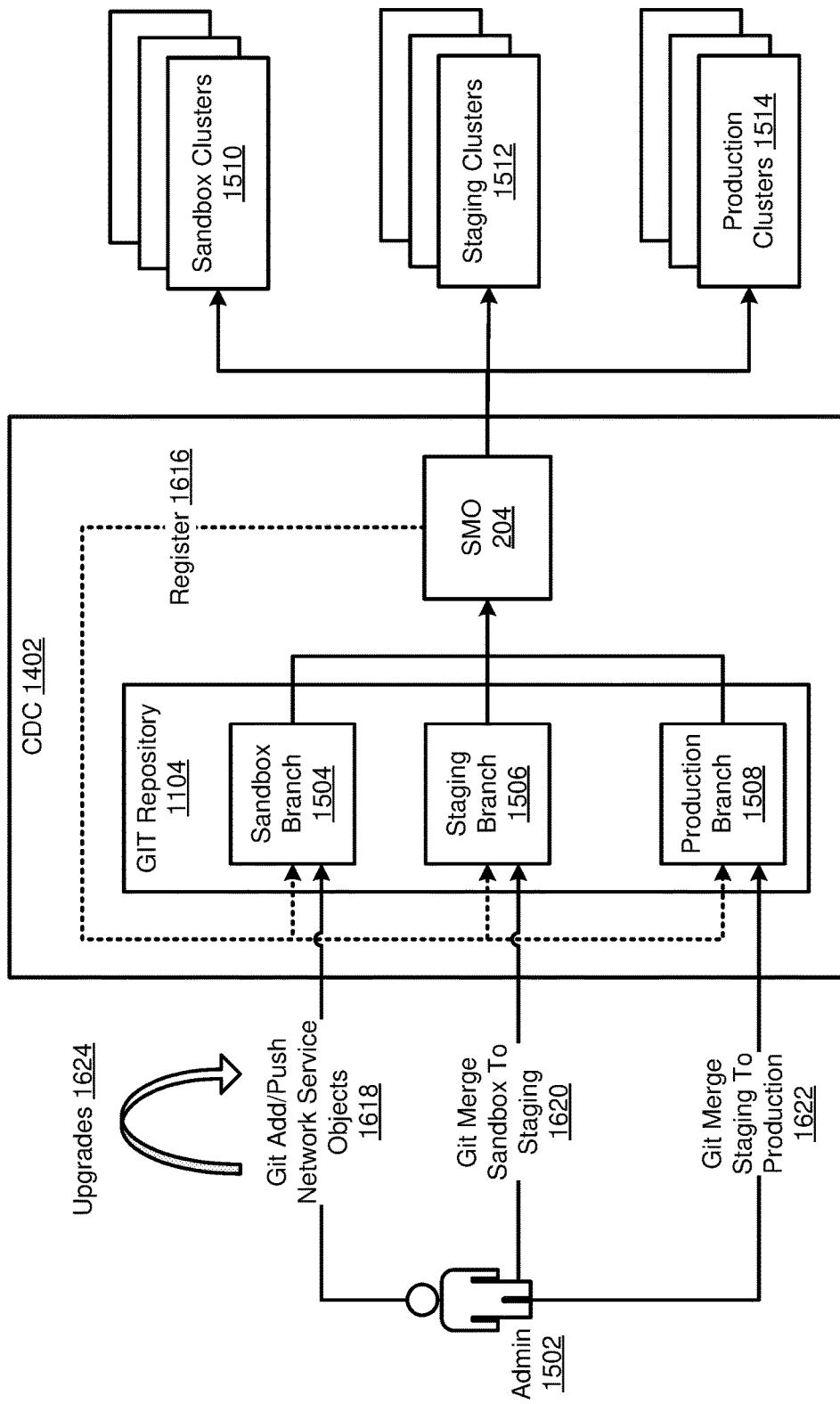
FIG. 16 is a schematic diagram of a system and process flow for continuous delivery of application orchestration.

FIGS. 15 and 16 are schematic diagrams of a system and process flows 1500, 1600 for continuous delivery of infrastructure and clusters and continuous delivery of applications. FIG. 15 specifically illustrates a process flow for continuous delivery of infrastructure and clusters 1500, while FIG. 16 illustrates a process flow for continuous delivery of applications 1600. The process flows 1500, 1600 are executed within the same system framework.

The system illustrated in FIGS. 15-16 includes the CDC 1402, which includes the git repository 1104 and the SMO 204. The git repository 1104 includes a sandbox branch 1504, staging branch 1506, and production branch 1508. The CDC 1402 is in communication with sandbox clusters 1510, staging clusters 1512, and production clusters 1514. The system is managed by a system administrator 1502.

The process flow for continuous delivery of infrastructure and clusters begins with the administrator 1502 registering at 1516 the sandbox branch 1504, the staging branch 1506, and the production branch 1508 of the git repository 1104 with appropriate labels for the SMO 204. Additionally, the administrator 1502 registers the sandbox clusters 1510, staging clusters 1512, and production clusters 1514 with the corresponding git repository 1104 branches 1504-1508 by assigning appropriate labels with the SMO 204. The administrator 1502 registers the git repository 1104 with each of the branches 1504-1508 with the SMO 204 by providing a READ ONLY token. Now, the SMO 204 is notified of any check-ins occurring across the branches 1504-1508.

The process flow continues with the administrator 1502 adding or pushing a bare metal server 122 to the sandbox branch 1504 of the git repository 1104 (see step 1518). This triggers a notification from the git repository 1104 to the SMO 204 indicating that the bare metal server 122 has been added to the sandbox branch 1504. Because this is an ADD operation, the SMO 204 creates the bare metal element. The SMO 204 then launches an "Install OS" workflow to bring up the bare metal server 122. The administrator 1502 then performs additional tests on the bare metal server 122.

The process flow continues with the administrator 1502 merging the sandbox branch 1506 to the staging branch 1508 (see step 1520). This triggers a notification from the git repository 1104 to the SMO 204 indicating that the bare metal server 122 has been added to the staging branch 1506. Because this is an ADD operation, the SMO 204 creates the bare metal element. The SMO 204 then launches an "Install OS" workflow to bring up the bare metal server 122. The administrator 1502 then performs additional tests on the bare metal server 122.

The process flow continues with the administrator 1502 merging the staging branch 1506 to the production branch 1508 (see step 1522). This triggers a notification from the git repository 1104 to the SMO 204 indicating that the bare metal server 122 has been added to the production branch 1508. Because this is an ADD operation, the SMO 204 creates the bare metal element. The SMO 204 then launches an "Install OS" workflow to bring up the bare metal server 122. The administrator 1502 then performs additional tests on the bare metal server 122.

Different components of bare metal servers 122 are upgraded with design patterns, bios, BMC, NIC, NVME, OS, kernal, RPM, and so forth. There is a workflow associated with each upgrade. The upgrades 1524 process is initiated by the administrator 1502 updated a bare metal server 122 profile pack element for the relevant component upgrade by adding a new version. The administrator 1502 updates the bare metal server 122 to change the profile pack version and check in. This triggers a notification from the git repository 1104 to the SMO 204 indicating that the bare metal server 122 has been updated. The SMO 204 then determines which component of the bare metal server 122 profile pack has changed and then launches the corresponding upgrade workflow.

When provisioning the cluster and the infrastructure together, the administrator 1502 and system follow the same steps discussed above in connection with continuous delivery of the infrastructure and cluster 1500. Like the bare metal server 122 profile pack, there is a cluster profile pack that describes how a cluster is configured with various options like rpool, ip-pool, host vlan, and other settings. The infrastructure and the cluster are represented as YAML files.

As shown in FIG. 16, the process flow for continuous delivery of applications 1600 similarly begins with the administrator 1502 registering at 1616 the sandbox branch 1504, the staging branch 1506, and the production branch 1508 of the git repository 1104 with appropriate labels for the SMO 204. Additionally, the administrator 1502 registers the sandbox clusters 1510, staging clusters 1512, and production clusters 1514 with the corresponding git repository 1104 branches 1504-1508 by assigning appropriate labels with the SMO 204. The administrator 1502 registers the git repository 1104 with each of the branches 1504-1508 with the SMO 204 by providing a READ ONLY token. Now, the SMO 204 is notified of any check-ins occurring across the branches 1504-1508.

Once the continuous integration system delivers application artifacts (i.e., charts and images), the administrator 1502 adds network services objects to the sandbox branch 1504 (see step 1618). This triggers a notification from the git repository 1104 to the SMO 204 indicating that a network service object has been added to the sandbox branch 1504. The network service object may specify a cluster directly or allow the SMO 204 to automatically select a cluster (see provisioner 922 and cluster selector 924 at FIG. 9). If the SMO 204 selects the cluster, then the SMO 204 will determine the amount of CPU, memory, and storage required for the network service element to tally up helm chart values and tally up the helm chart templates file. The SMO 204 then selects the best fit cluster from active and available inventory based on the CPU, memory, and storage requirements. Because this is in ADD operation, the SMO 204 creates the network service object and then launches a "Create Network Service" workflow to bring up the application. The administrator 1502 then performs additional tests on the sandbox clusters 1510.

The administrator 1502 the merges the sandbox branch 1504 with the staging branch 1506 of the git repository 1104 (see step 1620). This triggers a notification from the git repository 1104 to the SMO 204 indicating that the network service object has been added to the staging branch 1506. The network service object may specify a cluster directly or allow the SMO 204 to automatically select a cluster (see provisioner 922 and cluster selector 924 at FIG. 9). If the SMO 204 selects the cluster, then the SMO 204 will determine the amount of CPU, memory, and storage required for the network service element to tally up helm chart values and tally up the helm chart templates file. The SMO 204 then selects the best fit cluster from active and available inventory based on the CPU, memory, and storage requirements. Because this is in ADD operation, the SMO 204 creates the network service object and then launches a "Create Network Service" workflow to bring up the application. The administrator 1502 then performs additional tests on the staging clusters 1512.

The administrator 1502 then merges the staging branch 1506 with the production branch 1508 (see step 1622). This triggers a notification from the git repository 1104 to the SMO 204 indicating that the network service object has been added to the production branch 1508. The network service object may specify a cluster directly or allow the SMO 204 to automatically select a cluster (see provisioner 922 and cluster selector 924 at FIG. 9). If the SMO 204 selects the cluster, then the SMO 204 will determine the amount of CPU, memory, and storage required for the network service element to tally up helm chart values and tally up the helm chart templates file. The SMO 204 then selects the best fit cluster from active and available inventory based on the CPU, memory, and storage requirements. Because this is in ADD operation, the SMO 204 creates the network service object and then launches a "Create Network Service" workflow to bring up the application. The administrator 1502 then performs additional tests on the production clusters 1514.

The upgrades 1624 process is initiated by the administrator 1502 performing a check-in on existing network service objects to indicate an upgrade. This triggers a notification from the git repository 1104 to the SMO 204 indicating that the network service object has been updated. The SMO 204 identifies the network service object name based on the name provided in the network service object within the branch. Because this is an update operation, the SMO 204 updates the network service object. This update to network service launches a workflow to update the network service on the sandbox clusters 1510. The administrator 1502 then performs additional tests on the sandbox clusters 1510. Like the continuous delivery for applications process flow described above, the administrator 1502 also merges the sandbox branch 1504 with the staging branch 1506 (like step 1620) and then merges the staging branch 1506 with the production branch 1508 (like step 1622).

The network service applications are a collection of network function packages, which include application packaging like helm charts. The network function packages may indicate a simple network service with a cluster pre-selected, a simple network service with cluster auto-selected, or a simple network service with protection enabled.

Figure 17A:
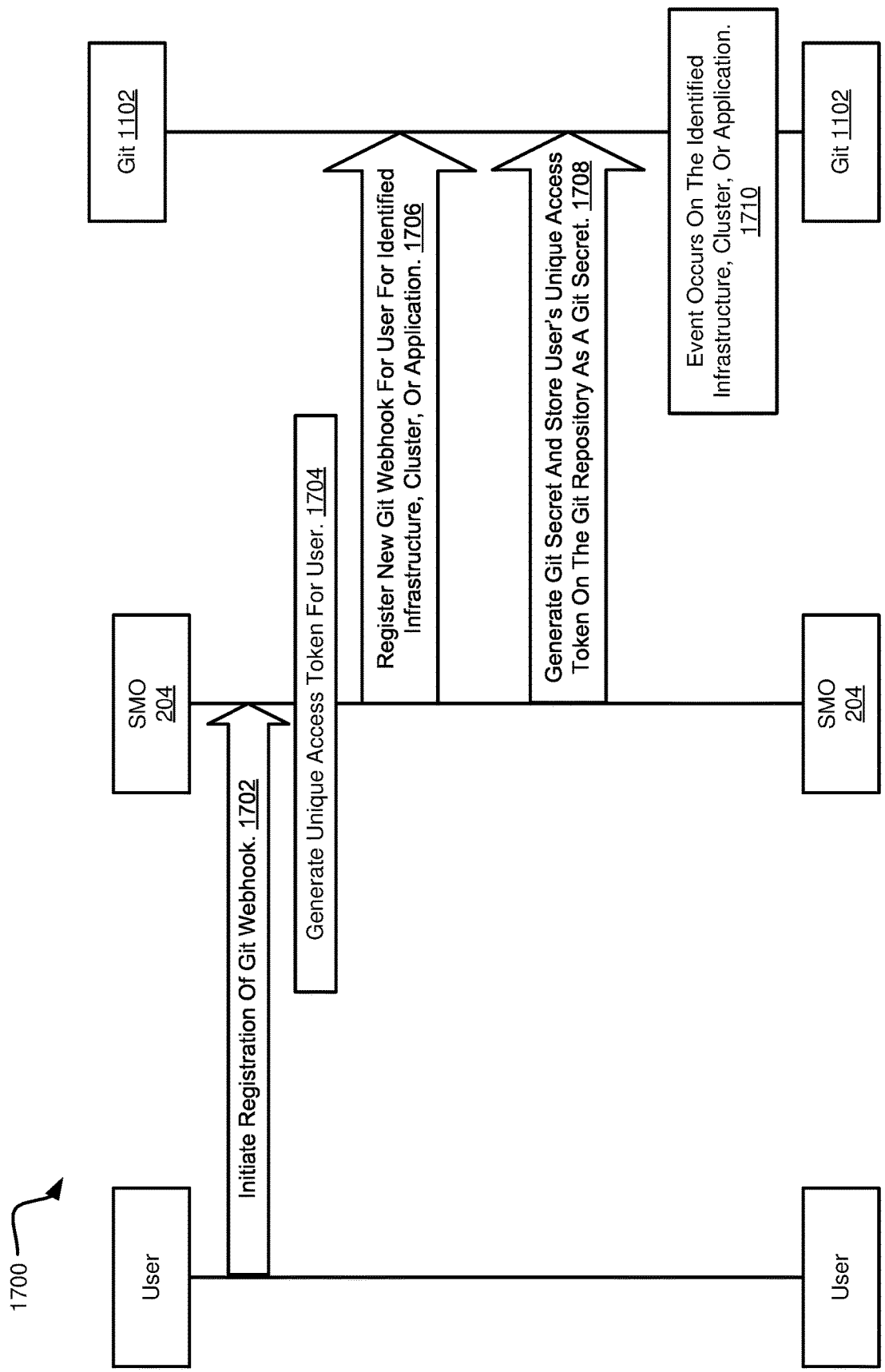
Figure 17B:
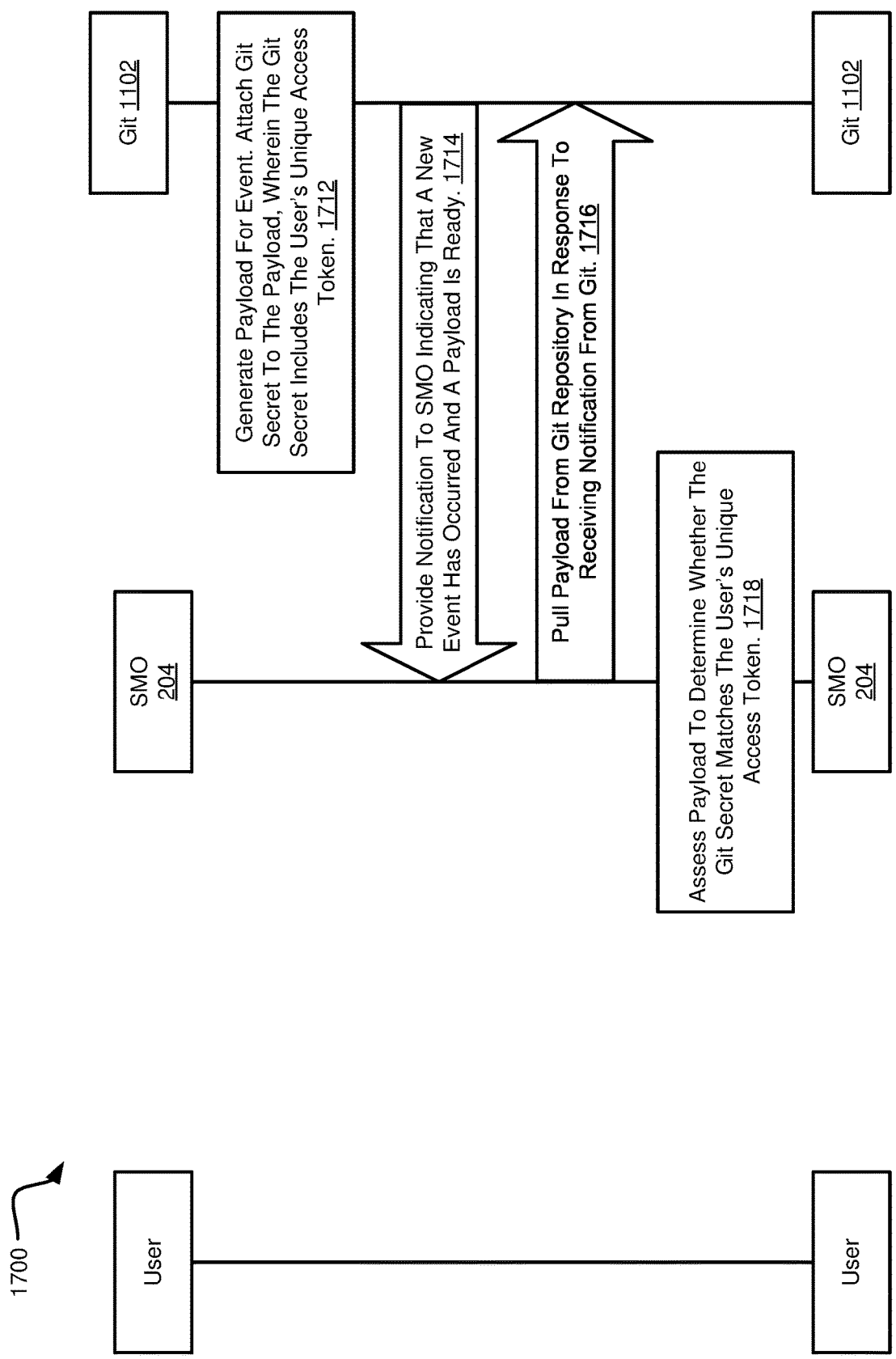

FIGS. 17A-17C are schematic block diagrams of a process flow 1700 for registering the SMO 204 to a git repository 1104 and then authorizing git 1102 payloads using git secrets 1214.

Git secrets 1214 are a bash tool to store private data within a git repository 1104. The git repository 1104 encrypts the git secrets 1214 with public keys of trusted users, and those users may decrypt the git secrets 1214 using a personal secret key. The git secret 1214 is created after creating an RSA (Rivest-Shamir-Adleman) key pair, which includes a public key and a secret key. The RSA key pair may be stored somewhere in a home directory for the SMO 204. The git secret 1214 is initialized on a new git repository 1104 by running a program for generating the git secret 1214. One or more users are then added to the git secret 1214 repository keyring and then files are encrypted and added to the git secrets 1214 repository. The git 1102 is instructed to run a program to encrypt the files within the git secret 1214 repository using a public key from the RSA key pair. The git secret 1214 files may later be decrypted using the private key from the RSA key pair.

The process flow 1700 leverages git secrets 1214 to enable authorization of payloads retrieved from the git repository 1104. Git 1102 restricts payload formatting such that an additional authorization header cannot be added to the payloads. The process flow 1700 is implemented to ensure that incoming payloads are authentic and authorized prior to executing a git command 1206.

The process flow 1700 begins with a user initiating at 1702 registration of a new git webhook 1212. The git webhook 1212 allows a user to build or set up integrations that subscribe to certain events on the git 1102. When one of those events is triggered, the git 1102 sends an HTTP POST payload to a URL associated with the git webhook 1212. Git webhooks 1212 can be used to update an external issue tracker, trigger CI builds, update a backup mirror, or deploy to a production server. The git webhooks 1212 may be installed on an organization, a specific git repository 1104, or an application for git 1102. Once installed, the git webhook 1212 will be sent each time one or more subscribed events occurs. When configuring the git webhook 1212 at 1702, the user may use a user interface or API to select which events should send payloads. Each event corresponds to a certain set of actions that can happen to an organization and/or git repository 1104. For example, if the user subscribes to an "issues" event, then the git 1102 will issue a payload every time an issue is opened, closed, labeled, and so forth.

The process flow 1700 continues and the SMO 204 generates at 1704 a unique access token for the user. The SMO 204 then registers at 1706 the new git webhook 1212 for the user, wherein the git webhook 1212 is associated with an identified infrastructure, cluster, or application. The SMO 204 generates at 1708 a git secret and stores the user's unique access token on the git repository 1104 as a git secret 1214.

When registering a new git repository 1102 with the SMO 204, there is a new API endpoint added that is common to all users of the git repository 1102. The handler generates a long-living new token for logged-in users from SMO's 204 secret that includes an expiry data, user ID, and privilege maps unique to the application. The handler registers the git repository 1102 details including the token. The token may include user details (identifier, token) and git details (URL, name, description, token). The process includes providing a new post-push notification endpoint POST /gitrepo/{uid}/postpush/ along with details on the git secret 1214, which is the token.

The git 1102 then identifies at 1710 that an event has occurred on the subscribed infrastructure, cluster, or application. The git 1102 can be configured to automatically send a notification to the SMO 204 after the event has occurred. Git 1102 notification registration may be performed by a system administrator logging into the git repository 1104 and adding a new webhook. The administrator sets a payload URL for the webhook to /gitrepo/{uid}/postpush/, and then sets the content type to application/json. The administrator further sets the git secret 1214 to the token.

The git 1102 determines that a git webhook 1212 has been established that subscribes to certain events on the identified infrastructure, cluster, or application. In response to the subscribed event occurring at 1710, the git 1102 generates a payload at 1712 for the event. The git 1102 attaches the git secret comprising the user's unique access token to the payload.

The git 1102 then provides a notification at 1714 to the SMO 204 indicating that a new event has occurred, and a payload is ready for retrieval. The SMO 204 may authenticate the payload. When a git webhook is received, the SMO 204 obtains the X-Hub-Signature-256 header and obtains the token from a database for the git repository 1104 UID. The SMO 204 generates an HMAC digest with SHA256, a request body, and the token obtained from the database for the git repository 1104. If the digest matches the git webhook received, then the payload is authenticated. If the git repository 1102 is valid, then the SMO 204 will proceed to pull the payload from the git repository.

The SMO 204 pulls the payload at 1716 from the git repository 1104 in response to receiving the notification from git 1102. The SMO 204 assesses the payload at 1718 to determine whether the git secret 1214 matches the user's unique access token. This step includes the SMO 204 de-encrypting the git secret 1214 using a private key of a key pair. After de-encrypting, the SMO 204 compares the known unique access token for the user against the access token that was encrypted within the git secret 1214 and attached to the payload.

If the SMO 204 determines that the access token included within the git secret 1214 does not match the known access token for the user, then the SMO 204 will determine at 1720 that the payload is illegitimate and will immediately discard the payload. If the SMO 204 determines that the access token included within the git secret 1214 matches the known access token for the user, then the SMO 204 will determine at 1722 that the payload is legitimate. The SMO 204 authorizes the payload at 1722 and then instructs applicable workers 206 to execute a git commit 1206 command based on the contents of the payload.

Figure 18:
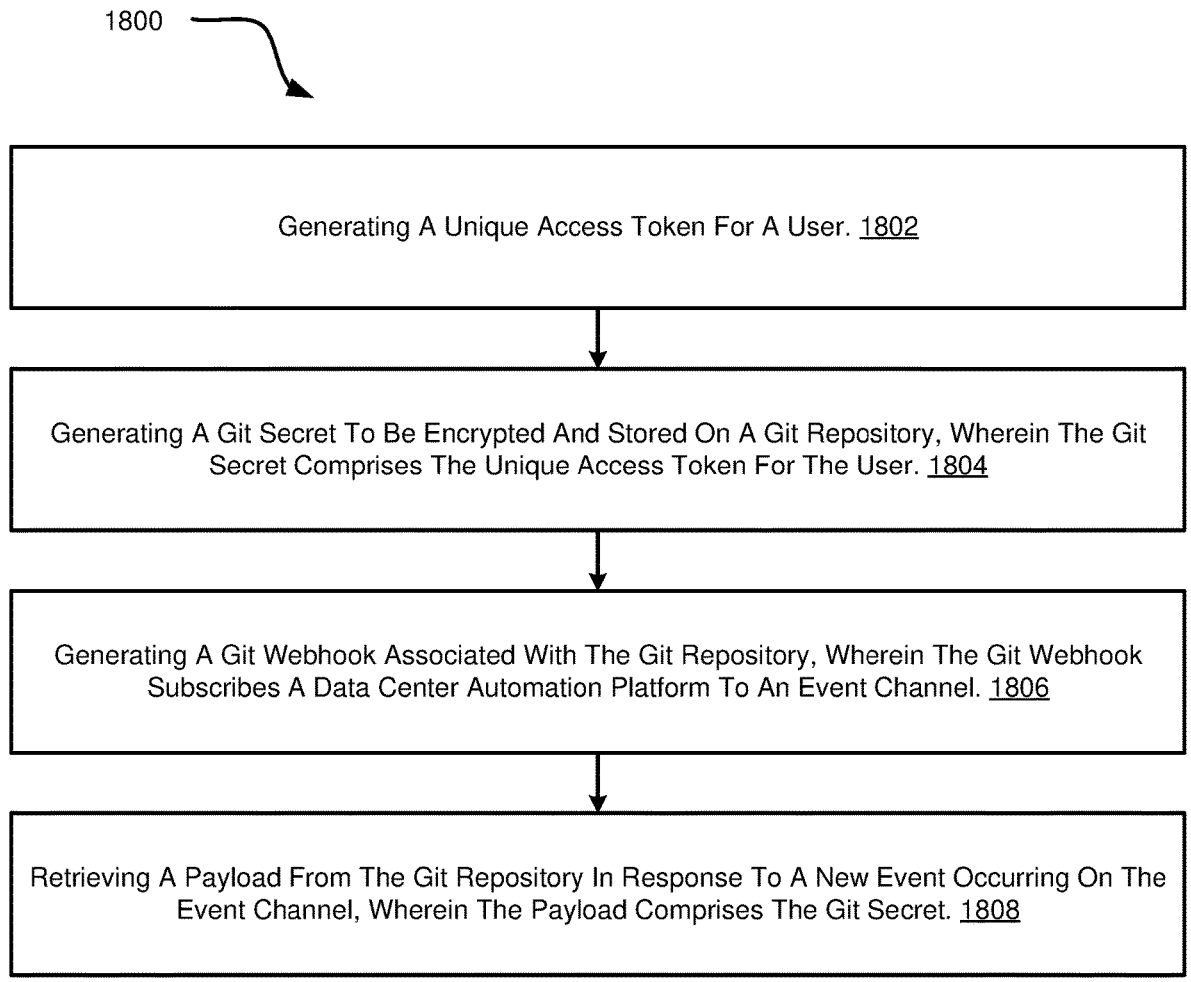
FIG. 18 is a schematic flow chart diagram of an example method for git webhook authorization for GitOps management operations.

FIG. 18 is a schematic flow chart diagram of a method 1800 for git webhook authorization for GitOps management operations. The method 1800 includes generating at 1802 a unique access token for a user. The method 1800 includes generating at 1804 a git secret to be encrypted and stored on a git repository, wherein the git secret comprises the unique access token for the user. The method 1800 includes generating at 1806 a git webhook associated with the git repository, wherein the git webhook subscribes a data center automation platform to an event channel. The method 1800 includes retrieving at 1808 a payload from the git repository in response to a new event occurring on the vent channel, wherein the payload comprises the git secret.

Figure 19:
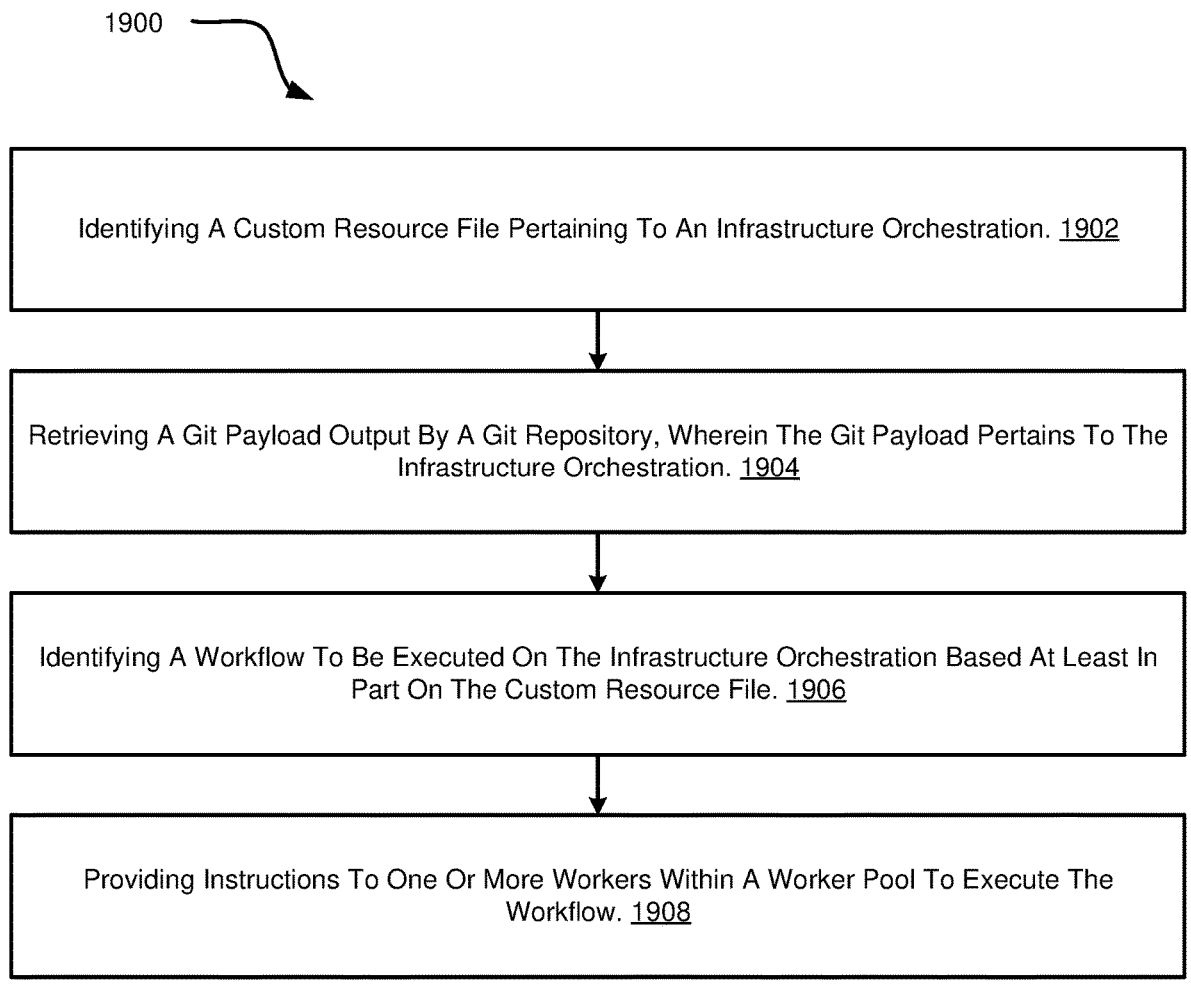
FIG. 19 is a schematic flow chart diagram of an example method for agentless GitOps and custom resources for infrastructure orchestration and management.

FIG. 19 is a schematic flow chart diagram of a method 1900 for agentless GitOps and custom resources for infrastructure orchestration and management. The method 1900 includes identifying at 1902 a custom resource file pertaining to an infrastructure orchestration. The method 1900 includes retrieving at 1904 a git payload output by a git repository, wherein the git payload pertains to the infrastructure orchestration. The method 1900 includes identifying at 1906 a workflow to be executed on the infrastructure orchestration based at least in part on the custom resource file. The method 1900 includes providing at 1908 instructions to one or more workers within a worker pool to execute the workflow.

Figure 20:
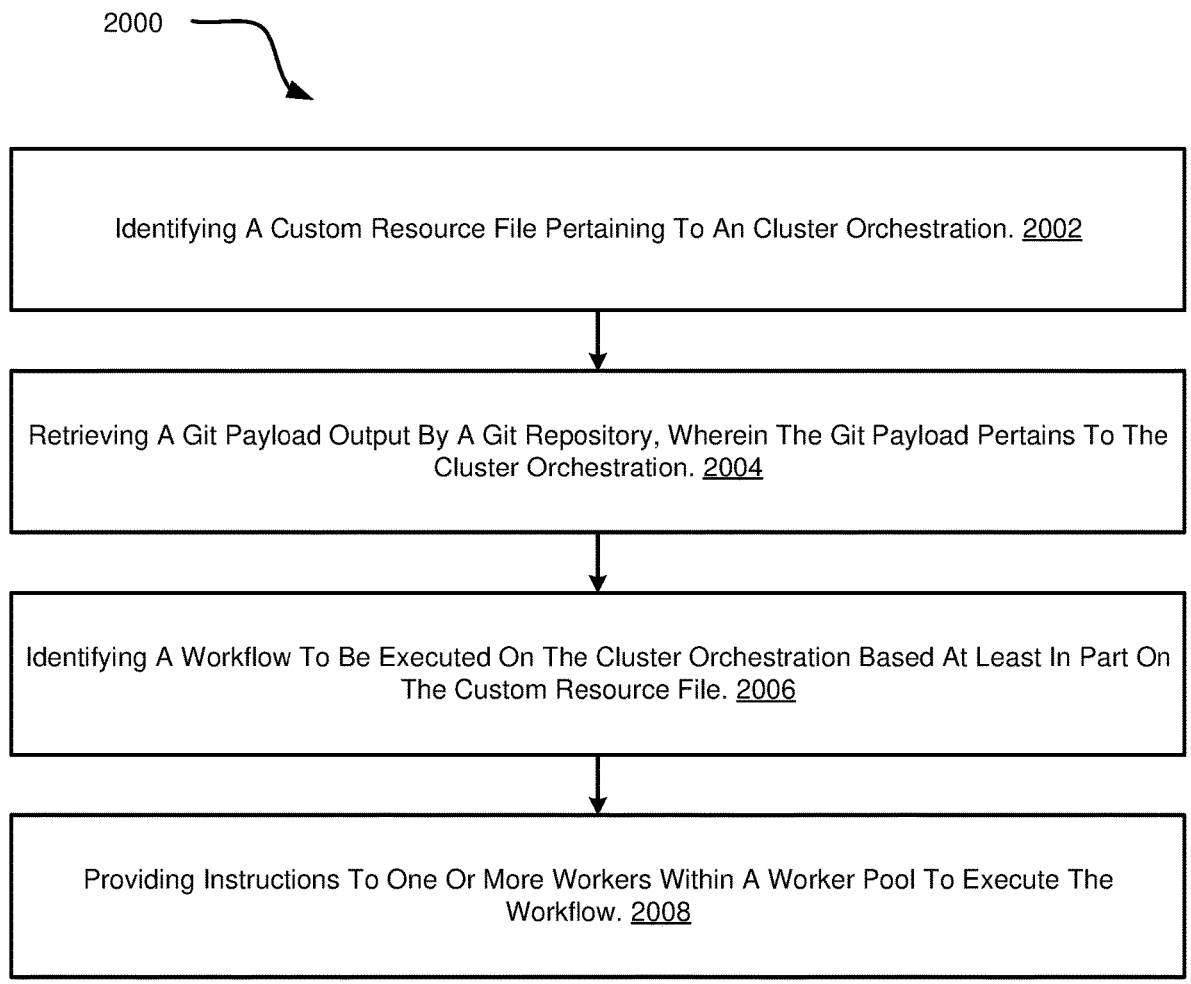
FIG. 20 is a schematic flow chart diagram of an example method for agentless GitOps and custom resources for cluster orchestration and management.

FIG. 20 is a schematic flow chart diagram of a method 2000 for agentless GitOps and custom resources for cluster orchestration and management. The method 2000 includes identifying at 2002 a custom resource file pertaining to a cluster orchestration. The method 2000 includes retrieving at 2004 a git payload output by a git repository, wherein the git payload pertains to the cluster orchestration. The method 2000 includes identifying at 2006 a workflow to be executed on the cluster orchestration based at least in part on the custom resource file. The method 2000 includes providing at 2008 instructions to one or more workers within a worker pool to execute the workflow.

Figure 21:
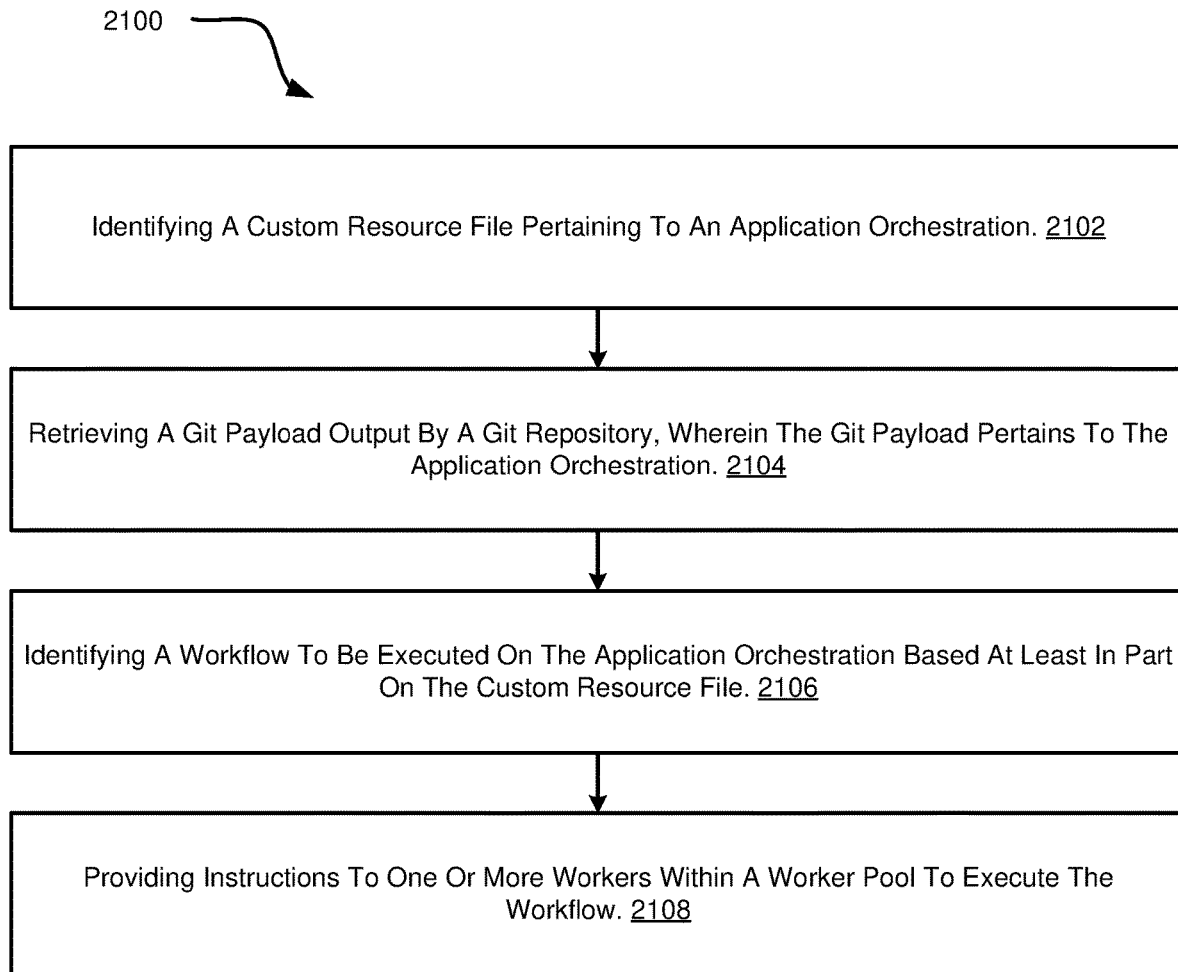
FIG. 21 is a schematic flow chart diagram of an example method for agentless GitOps and custom resources for application orchestration and management.

FIG. 21 is a schematic flow chart diagram of a method 2100 for agentless GitOps and custom resources for application orchestration and management. The method 2100 includes identifying at 2102 a custom resource file pertaining to an application orchestration. The method 2100 includes retrieving at 2104 a git payload output by a git repository, wherein the git payload pertains to the application orchestration. The method 2100 includes identifying at 2106 a workflow to be executed on the application orchestration based at least in part on the custom resource file. The method 2100 includes providing at 2108 instructions to one or more workers within a worker pool to execute the workflow.

Figure 22:
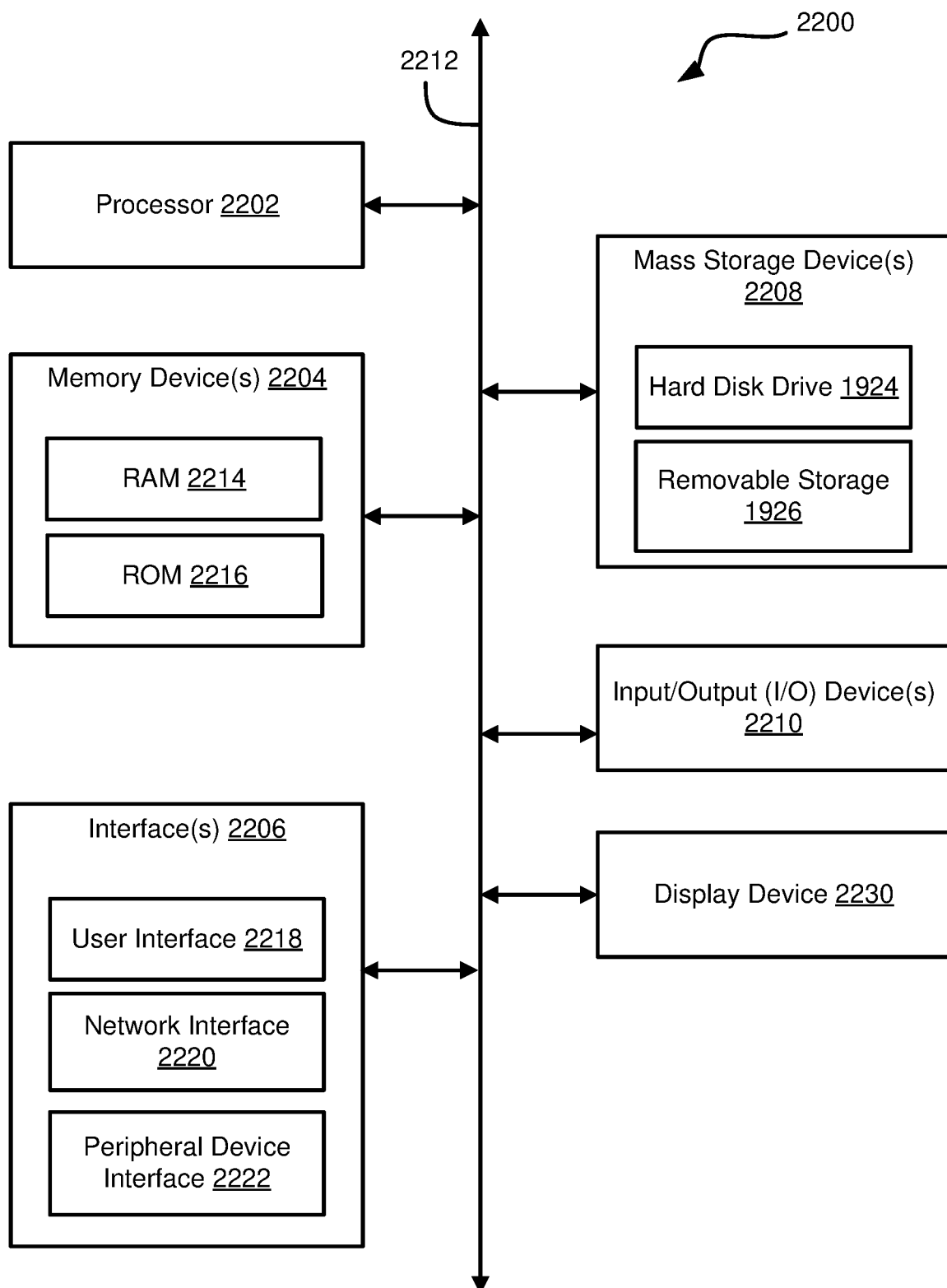
FIG. 22 is a schematic block diagram of an example computing device suitable for implementing methods in accordance with embodiments of the invention.

FIG. 22 illustrates a schematic block diagram of an example computing device 2200. The computing device 2200 may be used to perform various procedures, such as those discussed herein. The computing device 2200 can perform various monitoring functions as discussed herein, and can execute one or more application programs, such as the application programs or functionality described herein. The computing device 2200 can be any of a wide variety of computing devices, such as a desktop computer, in-dash computer, vehicle control system, a notebook computer, a server computer, a handheld computer, tablet computer and the like.

The computing device 2200 includes one or more processor(s) 2204, one or more memory device(s) 2204, one or more interface(s) 2206, one or more mass storage device(s) 2208, one or more Input/output (I/O) device(s) 2210, and a display device 2230 all of which are coupled to a bus 2212. Processor(s) 2204 include one or more processors or controllers that execute instructions stored in memory device(s) 2204 and/or mass storage device(s) 2208. Processor(s) 2204 may also include several types of computer-readable media, such as cache memory.

Memory device(s) 2204 include various computer-readable media, such as volatile memory (e.g., random access memory (RAM) 2214) and/or nonvolatile memory (e.g., read-only memory (ROM) 2216). Memory device(s) 2204 may also include rewritable ROM, such as Flash memory.

Mass storage device(s) 2208 include various computer readable media, such as magnetic tapes, magnetic disks, optical disks, solid-state memory (e.g., Flash memory), and so forth. As shown in FIG. 22, a particular mass storage device 2208 is a hard disk drive 2224. Various drives may also be included in mass storage device(s) 2208 to enable reading from and/or writing to the various computer readable media. Mass storage device(s) 2208 include removable media 2226 and/or non-removable media.

I/O device(s) 2210 include various devices that allow data and/or other information to be input to or retrieved from computing device 2200. Example I/O device(s) 2210 include cursor control devices, keyboards, keypads, microphones, monitors or other display devices, speakers, printers, network interface cards, modems, and the like.

Display device 2230 includes any type of device capable of displaying information to one or more users of computing device 2200. Examples of display device 2230 include a monitor, display terminal, video projection device, and the like.

Interface(s) 2206 include various interfaces that allow computing device 2200 to interact with other systems, devices, or computing environments. Example interface(s) 2206 may include any number of different network interfaces 2220, such as interfaces to local area networks (LANs), wide area networks (WANs), wireless networks, and the Internet. Other interface(s) include user interface 2218 and peripheral device interface 2222. The interface(s) 2206 may also include one or more user interface elements 2218. The interface(s) 2206 may also include one or more peripheral interfaces such as interfaces for printers, pointing devices (mice, track pad, or any suitable user interface now known to those of ordinary skill in the field, or later discovered), keyboards, and the like.

Bus 2212 allows processor(s) 2204, memory device(s) 2204, interface(s) 2206, mass storage device(s) 2208, and I/O device(s) 2210 to communicate with one another, as well as other devices or components coupled to bus 2212. Bus 2212 represents one or more of several types of bus structures, such as a system bus, PCI bus, IEEE bus, USB bus, and so forth.

For purposes of illustration, programs and other executable program components are shown herein as discrete blocks, such as block 302 for example, although it is understood that such programs and components may reside at various times in different storage components of computing device 2200 and are executed by processor(s) 2202. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to preferred features of further embodiments:

Example 1 is a method for agentless GitOps and custom resources for application orchestration and management. The method includes identifying a custom resource file pertaining to an application orchestration, wherein the application orchestration comprises one or more applications to be executed by a cloud-native platform and retrieving a git payload output by a git repository, wherein the git payload pertains to the application orchestration. The method includes identifying a workflow to be executed on the application orchestration based at least in part on the custom resource file. The method includes providing instructions to one or more workers within a worker pool to execute the workflow.

Example 2 is a method as in Example 1, wherein the custom resource file is an application custom resource file comprising a network function package, and wherein the network function package describes a type of application package and identifies one or more data libraries to be used when executing the one or more applications.

Example 3 is a method as in any of Examples 1-2, wherein the custom resource file is an application custom resource file comprising a network function, wherein the network function is one or more of a cloud-native network function or a virtual network function.

Example 4 is a method as in any of Examples 1-3, wherein the network function comprises a network function package and identifies exactly one infrastructure for executing the one or more applications.

Example 5 is a method as in any of Examples 1-4, wherein the custom resource file is an application custom resource file comprising a network service, and wherein the network service describes one or more network functions to be executed by the cloud-native platform.

Example 6 is a method as in any of Examples 1-5, wherein the one or more applications are executed by one or more clusters within a cluster orchestration for a containerized workload management system, and wherein the one or more clusters are executed by one or more bare metal servers within an infrastructure orchestration.

Example 7 is a method as in any of Examples 1-6, wherein each of the one or more clusters comprises: a control plane node; a plurality of compute nodes in communication with the control plane node; a plurality of pods, wherein each of the plurality of pods is executed by one of the plurality of compute nodes; and a storage volume in communication with the plurality of compute nodes.

Example 8 is a method as in any of Examples 1-7, wherein the custom resource file comprises an API version string indicating a version for the custom resource file.

Example 9 is a method as in any of Examples 1-8, wherein the custom resource file comprises a string describing an infrastructure type for the application orchestration.

Example 90 is a method as in any of Examples 1-9, wherein the custom resource file comprises metadata mapping to one or more key-value pairs within a database, and wherein the one or more key-value pairs store metadata pertaining to the custom resource file.

Example 11 is a method as in any of Examples 1-10, wherein the custom resource file comprises metadata mapping to one or more key-value pairs within a database, and wherein the one more key-value pairs store a specification for the custom resource file.

Example 12 is a method as in any of Examples 1-11, wherein the custom resource is formatted as a YAML (yet another markup language) file.

Example 13 is a method as in any of Examples 1-12, wherein the git repository comprises a file server configured to track and save a history of changes made to the application orchestration over time.

Example 14 is a method as in any of Examples 1-13, wherein the git repository is public.

Example 15 is a method as in any of Examples 1-14, wherein the git repository is private.

Example 16 is a method as in any of Examples 1-15, wherein receiving the git payload output by the git repository comprises: receiving a notification from the git repository that an event has occurred on the application orchestration, and that the git payload is ready to be retrieved; identifying a URL (uniform resource locator) associated with a git webhook corresponding with the application orchestration; and pulling the git payload by way of the URL.

Example 17 is a method as in any of Examples 1-16, further comprising establishing a git webhook between the git repository and a data center automation platform, wherein the git webhook is a REST API registered to the git repository.

Example 18 is a method as in any of Examples 1-17, further comprising periodically polling the git repository to identify whether an event has occurred on the application orchestration.

Example 19 is a method as in any of Examples 1-18, further comprising, in response to determining that the event has occurred on the application orchestration, cloning at least a portion of the git repository.

Example 20 is a method as in any of Examples 1-19, tracking user commits to the git repository to identify whether a user has added a file to the git repository, deleted a file on the git repository, or updated a file on the git repository.

Example 21 is a system including one or more processors each configured to execute instructions stored in non-transitory computer readable storage medium, the instructions comprising any of the method steps of Examples 1-20.

Example 22 is non-transitory computer readable storage medium storing instructions for execution by one or more processors, the instructions comprising any of the method steps of Examples 1-20.

Example 23 is a system. The system includes a bare metal server running a cloud native application and a plurality of clusters running on the bare metal server, wherein at least a portion of the plurality of clusters executes an application. The system includes a data center automation platform responsible for service management and orchestration for the bare metal server, wherein the data center automation platform subscribes to a git repository to receive updates pertaining to the application, and wherein a read only token is established between the git repository and the data center automation platform.

Example 24 is a system as in Example 23, wherein the data center automation platform subscribes to the git repository by way of a git webhook.

Example 25 is a system as in any of Examples 23-24, wherein the git repository notifies the data center automation platform when a new payload has been generated; and wherein the data center automation platform is notified of the new payload by way of the git webhook.

Example 26 is a system as in any of Examples 23-25, wherein the data center automation platform pulls the new payload from the git repository by way of a URL (uniform resource locator) associated with the git webhook.

Example 27 is a system as in any of Examples 23-26, wherein the data center automation platform executes one or more of continuous integration (CI) or continuous delivery (CD) for application orchestration on the bare metal server based at least in part on data received from the git repository.

Example 28 is a system as in any of Examples 23-27, wherein the bare metal server is connected to the cloud native application by way of a 5G radio access network.

Example 29 is a system as in any of Examples 23-28, wherein there is no GitOps agent installed on any of the plurality of clusters; and wherein the data center automation platform is not granted write access to the git repository.

Example 30 is a system as in any of Examples 23-29, wherein the git repository notifies the data center automation platform when one or more of a change or a reconciliation is to be applied to the plurality of clusters; and wherein the data center automation platform applies the one or more of the change or the reconciliation to the plurality of clusters in response to being notified by the git repository.

Example 31 is a system as in any of Examples 23-30, wherein a user initiates a process to protect the application across the portion of the plurality of clusters by updating the git repository; wherein the data center automation platform automatically executes the process to protect the application in response to receiving a corresponding notification from the git repository; and wherein the process to protect the application comprises one or more of executing a snapshot on the application, cloning the application, rolling back the application, or backing up the application.

Example 32 is a system as in any of Examples 23-31, wherein a user initiates a user to deploy and/or upgrade the application across every cluster within the plurality of clusters that executes the application by updating the git repository; and wherein the data center automation platform automatically deploys and/or upgrades the application across every cluster within the plurality of clusters that executes the application in response to receiving a corresponding notification from the git repository.

Example 33 is a system as in any of Examples 23-32, further comprising a continuous integration module that delivers one or more application artifacts for the application; wherein delivery of the one or more application artifacts triggers a notification from the git repository to the data center automation platform indicating the one or more application artifacts have been received.

Example 34 is a system as in any of Examples 23-33, wherein, in response to receiving the one or more application artifacts, the application specifies a cluster of the plurality of clusters to execute the application; and wherein the data center automation platform initiates a workflow for the specified cluster to execute the application.

Example 35 is a system as in any of Examples 23-34, wherein, in response to receiving the one or more application artifacts, the data center automation platform identifies a cluster to execute the application in response to determining that the one or more application artifacts do not specify a cluster, and wherein identifying the cluster comprises: calculating an amount of CPU required to execute the application by tallying helm chart values within a YAML file associated with the application and tallying up a helm chart templates file associated with the application; calculating an amount of memory required to execute the application by tallying helm chart values within a YAML file associated with the application and tallying up a helm chart templates file associated with the application; and identifying a cluster to execute the application, wherein the identified cluster is selected from an inventory of active and available clusters of the plurality of clusters.

Example 36 is a system as in any of Examples 23-35, wherein the data center automation platform executes instructions comprising: identifying a custom resource file pertaining to an orchestration for the application; retrieving a git payload output by the git repository, wherein the git payload pertains to the orchestration for the application; identifying a workflow to be executed on the application based at least in part on the custom resource file; and providing instructions to one or more workers within a worker pool to execute the workflow.

Example 37 is a system as in any of Examples 23-36, wherein the custom resource file is an application custom resource file comprising a network function package, and wherein the network function package describes a type of application package and identifies one or more data libraries to be used when executing the one or more applications.

Example 39 is a system as in any of Examples 23-37, wherein the custom resource file is an application custom resource file comprising a network function, wherein the network function is one or more of a cloud-native network function or a virtual network function.

Example 40 is a system as in any of Examples 23-39, wherein each of the plurality of clusters comprises: a control plane node; a plurality of compute nodes in communication with the control plane node; a plurality of pods, wherein each of the plurality of pods is executed by one of the plurality of compute nodes; and a storage volume in communication with the plurality of compute nodes.

Example 41 is a system as in any of Examples 23-40, wherein the git repository comprises a file server configured to track and save a history of changes made to the application over time.

Example 42 is a system as in any of Examples 23-41, wherein the data center automation platform receives a git payload from the git repository, and wherein receiving the git payload comprises: receiving a notification from the git repository that an event has occurred on the application, and that the git payload is ready to be retrieved; identifying a URL (uniform resource locator) associated with a git webhook corresponding with the application orchestration; and pulling the git payload by way of the URL.

Example 43 is a system as in any of Examples 23-42, further comprising a git webhook established between the git repository and the data center automation platform, wherein the git webhook is a REST API registered to the git repository.

It will be appreciated that various features disclosed herein provide significant advantages and advancements in the art. The following claims are exemplary of some of those features.

In the foregoing Detailed Description of the Disclosure, various features of the disclosure are grouped together in a single embodiment for the purpose of streamlining the disclosure. This method of disclosure is not to be interpreted as reflecting an intention that the claimed disclosure requires more features than are expressly recited in each claim. Rather, inventive aspects lie in less than all features of a single foregoing disclosed embodiment.

It is to be understood that any features of the above-described arrangements, examples, and embodiments may be combined in a single embodiment comprising a combination of features taken from any of the disclosed arrangements, examples, and embodiments.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements.

Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and claims to refer to particular system components. As one skilled in the art will appreciate, components may be referred to by different names. This document does not intend to distinguish between components that differ in name, but not function.

The foregoing description has been presented for the purposes of illustration and description. It is not intended to be exhaustive or to limit the disclosure to the precise form disclosed. Many modifications and variations are possible in light of the above teaching. Further, it should be noted that any or all the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
a bare metal server;
a plurality of clusters running on the bare metal server, wherein at least a portion of the plurality of clusters executes an application; and
a data center automation platform responsible for service management and orchestration for the bare metal server;
wherein the data center automation platform subscribes to a git repository to receive updates pertaining to the application; and
wherein a read only token is established between the git repository and the data center automation platform.

2. The system of claim 1, wherein the data center automation platform subscribes to the git repository by way of a git webhook.

3. The system of claim 2, wherein the git repository notifies the data center automation platform when a new payload has been generated; and
wherein the data center automation platform is notified of the new payload by way of the git webhook.

4. The system of claim 3, wherein the data center automation platform pulls the new payload from the git repository by way of a URL (uniform resource locator) associated with the git webhook.

5. The system of claim 1, wherein the data center automation platform executes one or more of continuous integration (CI) or continuous delivery (CD) for application orchestration on the bare metal server based at least in part on data received from the git repository.

6. The system of claim 1, wherein the bare metal server is connected to a cloud native application by way of a 5G radio access network.

7. The system of claim 1, wherein there is no GitOps agent installed on any of the plurality of clusters; and
wherein the data center automation platform is not granted write access to the git repository.

8. The system of claim 1, wherein the git repository notifies the data center automation platform when one or more of a change or a reconciliation is to be applied to the plurality of clusters; and
wherein the data center automation platform applies the one or more of the change or the reconciliation to the plurality of clusters in response to being notified by the git repository.

9. The system of claim 1, wherein a user initiates a process to protect the application across the portion of the plurality of clusters by updating the git repository;
wherein the data center automation platform automatically executes the process to protect the application in response to receiving a corresponding notification from the git repository; and
wherein the process to protect the application comprises one or more of executing a snapshot on the application, cloning the application, rolling back the application, or backing up the application.

10. The system of claim 1, wherein a user initiates a user to deploy and/or upgrade the application across every cluster within the plurality of clusters that executes the application by updating the git repository; and
wherein the data center automation platform automatically deploys and/or upgrades the application across every cluster within the plurality of clusters that executes the application in response to receiving a corresponding notification from the git repository.

11. The system of claim 1, further comprising a continuous integration module that delivers one or more application artifacts for the application;
wherein delivery of the one or more application artifacts triggers a notification from the git repository to the data center automation platform indicating the one or more application artifacts have been received.

12. The system of claim 11, wherein, in response to receiving the one or more application artifacts, the application specifies a cluster of the plurality of clusters to execute the application; and
wherein the data center automation platform initiates a workflow for the specified cluster to execute the application.

13. The system of claim 1, wherein the data center automation platform executes instructions comprising:
identifying a custom resource file pertaining to an orchestration for the application;
retrieving a git payload output by the git repository, wherein the git payload pertains to the orchestration for the application;
identifying a workflow to be executed on the application based at least in part on the custom resource file; and
providing instructions to one or more workers within a worker pool to execute the workflow.

14. The system of claim 13, wherein the custom resource file is an application custom resource file comprising a network function package, and wherein the network function package describes a type of application package and identifies one or more data libraries to be used when executing the applications, the application being one of one or more applications executed by the plurality of clusters.

15. The system of claim 13, wherein the custom resource file is an application custom resource file comprising a network function, wherein the network function is one or more of a cloud-native network function or a virtual network function.

16. The system of claim 1, wherein each of the plurality of clusters comprises:
a control plane node;
a plurality of compute nodes in communication with the control plane node;
a plurality of pods, wherein each of the plurality of pods is executed by one of the plurality of compute nodes; and
a storage volume in communication with the plurality of compute nodes.

17. The system of claim 1, wherein the git repository comprises a file server configured to track and save a history of changes made to the application over time.

18. The system of claim 1, wherein the data center automation platform receives a git payload from the git repository, and wherein receiving the git payload comprises:
receiving a notification from the git repository that an event has occurred on the application, and that the git payload is ready to be retrieved;
identifying a URL (uniform resource locator) associated with a git webhook corresponding with orchestration of the application; and
pulling the git payload by way of the URL.

19. The system of claim 1, further comprising a git webhook established between the git repository and the data center automation platform, wherein the git webhook is a REST API registered to the git repository.

20. A system comprising:
a bare metal server;
a plurality of clusters running on the bare metal server, wherein at least a portion of the plurality of clusters executes an application; and
a data center automation platform responsible for service management and orchestration for the bare metal server;
wherein the data center automation platform subscribes to a git repository to receive updates pertaining to the application; and
wherein a read only token is established between the git repository and the data center automation platform
wherein the system further comprises a continuous integration module that delivers one or more application artifacts for the application;
wherein delivery of the one or more application artifacts triggers a notification from the git repository to the data center automation platform indicating the one or more application artifacts have been received;
wherein, in response to receiving the one or more application artifacts, the data center automation platform identifies a cluster to execute the application in response to determining that the one or more application artifacts do not specify a cluster, and wherein identifying the cluster comprises:
calculating an amount of CPU required to execute the application by tallying helm chart values within a YAML file associated with the application and tallying up a helm chart templates file associated with the application;
calculating an amount of memory required to execute the application by tallying helm chart values within a YAML file associated with the application and tallying up a helm chart templates file associated with the application; and
identifying a cluster to execute the application, wherein the identified cluster is selected from an inventory of active and available clusters of the plurality of clusters.

* * * * *